US012165458B2

(12) United States Patent
Kumagai

(10) Patent No.: US 12,165,458 B2
(45) Date of Patent: Dec. 10, 2024

(54) PAPER SHEET PROCESSING DEVICE AND PAPER SHEET PROCESSING METHOD

(71) Applicants: LAUREL BANK MACHINES CO., LTD., Tokyo (JP); LAUREL MACHINERY CO., LTD., Osaka (JP); LAUREL PRECISION MACHINES CO., LTD., Osaka (JP)

(72) Inventor: Hiroyuki Kumagai, Sakura (JP)

(73) Assignees: LAUREL BANK MACHINES CO., LTD., Tokyo (JP); LAUREL MACHINERY, CO., Osaka (JP); LAUREL PRECISION MACHINES CO., LTD., Osaka (JP)

( * ) Notice: Subject to any disclaimer, the term of this patent is extended or adjusted under 35 U.S.C. 154(b) by 610 days.

(21) Appl. No.: 17/437,444

(22) PCT Filed: Mar. 11, 2020

(86) PCT No.: PCT/JP2020/010412
§ 371 (c)(1),
(2) Date: Sep. 9, 2021

(87) PCT Pub. No.: WO2020/184592
PCT Pub. Date: Sep. 17, 2020

(65) Prior Publication Data

US 2022/0172548 A1 Jun. 2, 2022

(30) Foreign Application Priority Data

Mar. 14, 2019 (JP) ................................. 2019-046924

(51) Int. Cl.
*G07D 11/25* (2019.01)
*B65H 29/00* (2006.01)
(Continued)

(52) U.S. Cl.
CPC ........... *G07D 11/25* (2019.01); *B65H 29/001* (2013.01); *B65H 29/006* (2013.01); *G07D 11/10* (2019.01);
(Continued)

(58) Field of Classification Search
CPC ........ G07D 11/25; G07D 11/18; G07D 11/50; G07D 2211/00; B65H 29/001; B65H 2301/4191; B65H 2701/1912
See application file for complete search history.

(56) References Cited

U.S. PATENT DOCUMENTS

2018/0204404 A1 7/2018 Kokubo et al.

FOREIGN PATENT DOCUMENTS

JP 3753779 3/2006
JP 2008-276421 A 11/2008
(Continued)

OTHER PUBLICATIONS

Extended European Search Report mailed Nov. 11, 2022 in European Application No. 20769870.5, 9 pages.
(Continued)

*Primary Examiner* — Jeremy R Severson
(74) *Attorney, Agent, or Firm* — Nixon & Vanderhye P.C.

(57) ABSTRACT

A paper sheet processing device, which counts a plurality of paper sheets set in a deposit portion into groups of a predetermined batch number and dispenses them to a dispensing portion, includes a temporary holding portion configured to hold the paper sheets set in the deposit portion and feed the held paper sheets, and a control portion configured to perform feed control of the paper sheets in the temporary holding portion and transport control of the paper sheets set in the deposit portion, in which the control portion performs control to feed the paper sheets held in the temporary
(Continued)

holding portion divided into groups of the batch number and dispense the paper sheets to the dispensing portion.

11 Claims, 8 Drawing Sheets

(51) Int. Cl.

| | |
|---|---|
| ***G07D 11/10*** | (2019.01) |
| ***G07D 11/18*** | (2019.01) |
| ***G07D 11/20*** | (2019.01) |
| ***G07D 11/50*** | (2019.01) |
| ***G07D 11/60*** | (2019.01) |

(52) U.S. Cl.

CPC ............. *G07D 11/18* (2019.01); *G07D 11/20* (2019.01); *G07D 11/50* (2019.01); *G07D 11/60* (2019.01); *B65H 2301/4191* (2013.01); *B65H 2701/1912* (2013.01); *G07D 2211/00* (2013.01)

(56) References Cited

FOREIGN PATENT DOCUMENTS

| | | | | | |
|---|---|---|---|---|---|
| JP | 2012-150739 | | | 8/2012 | |
| JP | 2013149288 | A | * | 8/2013 | ......... G07D 11/0039 |
| JP | 2014-002621 | | | 1/2014 | |
| JP | 2014002621 | A | * | 1/2014 | |
| JP | 2017-027198 | | | 2/2017 | |
| JP | 2018-092381 | | | 6/2018 | |

OTHER PUBLICATIONS

International Search Report for PCT/JP2020/010412 dated Apr. 7, 2020, 5 pages.

Written Opinion of the ISA for PCT/JP2020/010412 dated Apr. 7, 2020, 4 pages.

* cited by examiner

PAPER SHEET PROCESSING DEVICE AND PAPER SHEET PROCESSING METHOD

TECHNICAL FIELD

The present disclosure relates to a paper sheet processing device and a paper sheet processing method.

This application is the U.S. national phase of International Application No. PCT/JP2020/010412 filed Mar. 11, 2020 which designated the U.S. and claims priority to Japanese Patent Application No. 2019-046924 filed Mar. 14, 2019, the entire contents of each of which are hereby incorporated by reference.

BACKGROUND ART

A paper sheet processing device classifies and accumulates banknotes according to a predetermined denomination. The paper sheet processing device described in Patent Document 1 has a function of classifying and accumulating banknotes according to a predetermined denomination, and also has an organization counting function of counting the banknotes of a specific denomination in a predetermined number (for example, 100).

PRIOR ART DOCUMENTS

Patent Document

[Patent Document 1]

SUMMARY OF THE INVENTION

Problems to be Solved by the Invention

This type of paper sheet processing device has two locations, a temporary holding portion and a dispensing portion, as transport destinations for the deposited banknotes. In this type of paper sheet processing device, it is possible to perform batch processing in which the banknotes of a specific denomination are collected in a predetermined number and taken out. When performing such batch processing, the paper sheet processing device identifies the banknotes set in the deposit portion and counts a predetermined number of the banknotes of a specific denomination. After that, the predetermined sheet of banknotes of the specific denomination (hereinafter, the number processed in one instance of batch processing is referred to as "batch number") are temporarily held in the temporary holding portion. The paper sheet processing device is adapted to feed a batch number of banknotes of a specific denomination held in the temporary holding portion from the temporary holding portion to the dispensing portion. When the batch number of banknotes are taken out from the dispensing portion, the paper sheet processing device temporarily holds the batch number of banknotes of the specific denomination identified from the banknotes set in the deposit portion in the temporary holding portion in the same manner as described above, and then feeds the banknotes to the dispensing portion. The paper sheet processing device repeats this processing a plurality of times until there are no more banknotes deposited in the deposit portion in this way.

For example, a case will be described in which 250 banknotes of a specific denomination are set in the deposit portion of the paper sheet processing device, and 100 (the batch number) are counted from the deposit portion and taken out to the dispensing portion. First of all, the paper sheet processing device identifies and counts the banknotes of the specific denomination transported from the deposit portion and holds the banknotes in the temporary holding portion. When the banknotes held in the temporary holding portion reach 100, these 100 banknotes are fed to the dispensing portion. Subsequently, the paper sheet processing device identifies and counts the banknotes of the specific denomination transported from the deposit portion, and holds the 100 banknotes again in the temporary holding portion. After that, the paper sheet processing device feeds these 100 banknotes held in the temporary holding portion to the dispensing portion. Finally, the paper sheet processing device identifies and counts the remaining 50 banknotes transported from the deposit portion and holds the banknotes in the temporary holding portion. After that, the paper sheet processing device feeds these 50 banknotes held in the temporary holding portion to the dispensing portion or a reject portion. In this way, the paper sheet processing device repeats the transport processing of transporting the banknotes of the specific denomination from the deposit portion to the temporary holding portion for each batch number (100), and ends the batch processing of a total of 250 banknotes.

Accordingly, when the number of banknotes set in the deposit portion is large, the number of times the transport processing of transporting the batch number of banknotes of the specific denomination from the deposit portion to the temporary holding portion is repeated increases. Accordingly, it takes long processing time for collecting each of the predetermined number (batch number) of the banknotes of a specific denomination from the banknotes set in the deposit portion . Such a problem occurs in the same manner when paper sheets other than banknotes are batch-processed.

Accordingly, an object of the present disclosure is to provide a paper sheet processing device and a paper sheet processing method which can improve the efficiency of batch processing for collecting each of predetermined number (batch number) of banknotes of a specific denomination from the banknotes of the specific denomination set in the deposit portion.

Means for Solving the Problems

A paper sheet processing device according to a first aspect of the present disclosure in which a plurality of paper sheets set in a deposit portion are counted into a predetermined batch number and the paper sheets are dispensed to a dispensing portion, includes a temporary holding portion which temporarily holds the paper sheets set in the deposit portion and feeds the held paper sheets to the dispensing portion, and a control portion which performs feed control of the paper sheets temporarily held in the temporary holding portion to the dispensing portion and transport control of the paper sheets set in the deposit portion to the temporary holding portion, in which the control portion continuously transports more of the paper sheets set in the deposit portion than the batch number to the temporary holding portion, and feeds the paper sheets held in the temporary holding portion divided into groups of the batch number and transports the paper sheets to the dispensing portion.

Further, a paper sheet processing method according to a second aspect of the present disclosure of counting a plurality of paper sheets set in a deposit portion for into a predetermined batch number and dispensing the paper sheets to a dispensing portion, includes calculating a number capable of being held in a temporary holding portion temporarily holding the plurality of paper sheets set in the deposit portion, transporting the calculated number of paper sheets capable of being held from the deposit portion to the temporary holding portion to hold the paper sheets, and transporting the paper sheets held in the temporary holding portion one by one to the dispensing portion until the batch number is reached.

Advantageous Effects of the Invention

According to the present disclosure, it is possible to provide a paper sheet processing device and a paper sheet processing method which can improve the efficiency of batch processing for collecting each of a predetermined number (batch number) of banknotes of a specific denomination from banknotes set in the deposit portion.

EMBODIMENTS FOR CARRYING OUT THE INVENTION

A paper sheet processing device of an embodiment will be described below with reference to the drawings. A paper sheet processing device 10 according to the present embodiment processes banknotes as one type of paper sheets. Of course, the paper sheet processing device 10 can also process paper sheets other than banknotes. The paper sheet processing device 10 can perform deposit processing for internally storing banknotes inserted from the outside and dispensing processing for dispensing the banknotes stored inside so that the banknotes can be taken out to the outside. In the following description, “front” is the side toward an operator, “rear” is the side away from the operator, “left” is the left as viewed by the operator, and “right” is the right as viewed by the operator.

Figure 1:
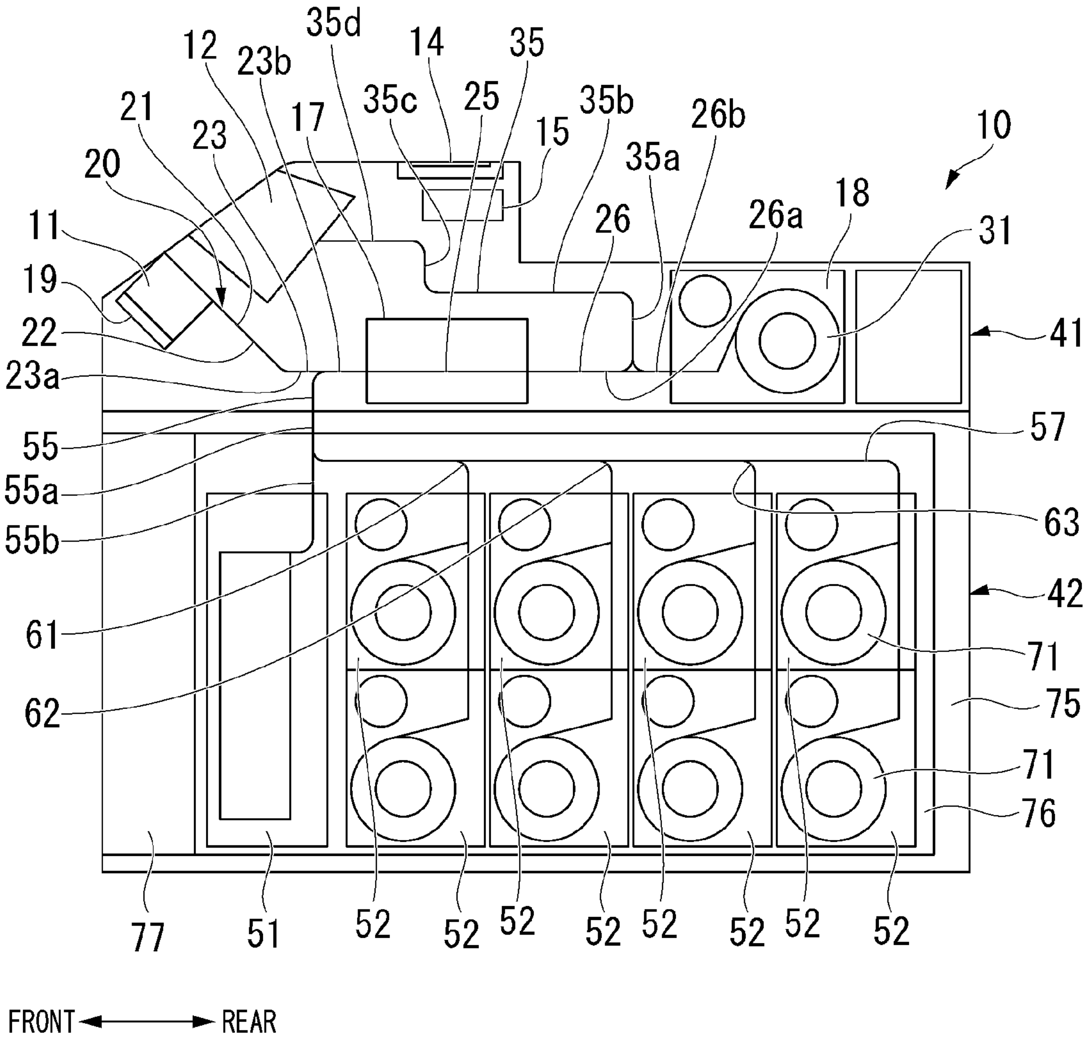
FIG. 1 is a side view showing an internal configuration of a paper sheet processing device according to an embodiment.

As shown in FIG. 1, a deposit portion 11 in which banknotes for deposit are set from the outside is provided on the upper portion of the front surface side of the paper sheet processing device 10. A dispensing portion 12 is provided above and behind the deposit portion 11. In the dispensing portion 12, unacceptable reject banknotes among the deposit banknotes are fed from the inside, and the dispensing banknotes are fed from the inside. These banknotes can be taken out from the dispensing portion 12 to the outside.

The deposit portion 11 is provided with a sensor (not shown) that detects the presence or absence of banknotes in the deposit portion 11. The dispensing portion 12 is also provided with a sensor (not shown) that detects the presence or absence of banknotes in the dispensing portion 12. The deposit portion 11 and the dispensing portion 12 are provided so that the positions thereof in the height direction partially overlap. Further, the deposit portion 11 and the dispensing portion 12 are provided so that the positions thereof in the front-rear direction also partially overlap. An operation display portion 14 (display portion) of a touch panel type that receives an operation input of the operator and performs display to the operator is provided behind the dispensing portion 12 on the upper surface of the paper sheet processing device 10. An arithmetic device 15 that controls the entirety of the paper sheet processing device 10 is provided at a lower portion of the operation display portion 14. The operation display portion 14 displays an operation screen of the paper sheet processing device 10 and an information screen related to the operation status.

Behind the deposit portion 11, an identification portion 17 for identifying a banknote is provided so that the position thereof in the height direction partially overlaps with the deposit portion 11. Behind the identification portion 17, a temporary holding portion 18 for temporarily holding the banknote identified by the identification portion 17 is provided so that the positions of the deposit portion 11 and the identification portion 17 partially overlap in the height direction. The lower portion of the deposit portion 11 and the upper portion of the identification portion 17 are provided at substantially the same position in the height direction. The upper portion of the deposit portion 11 is provided at a position higher than the lower portion of the identification portion 17. In the height direction, the identification portion 17 is disposed to be positioned at a lower portion from an intermediate portion of the temporary holding portion 18 in the height direction. The upper portion of the temporary holding portion 18 is provided at a position higher than the identification portion 17. The temporary holding portion 18 is provided so that the upper portion thereof is at substantially the same height as the lower portion of the dispensing portion 12. The deposit portion 11, the identification portion 17, and the temporary holding portion 18 are disposed in order from the front to the rear of the device. The deposit portion 11 is positioned in front of the identification portion 17, and the identification portion 17 is positioned in front of the temporary holding portion 18.

A mounting plate 19 is provided on the deposit portion 11 to be inclined rearward and downward. The mounting plate 19 rises in the rearward rising direction and descends in the frontward descending direction in the deposit portion 11. Banknotes in the accumulated state are placed on the mounting plate 19 in the descending state from the outside. The banknotes placed on the mounting plate 19 are accumulated in the rearward rising direction. The mounting plate 19 rises and transports the banknotes in the accumulated state in the rearward rising direction, and feeds the banknotes in the accumulated state one by one from the upper end in the accumulating direction into the paper sheet processing device 10.

The inside of the paper sheet processing device 10 has the deposit portion 11, the dispensing portion 12, the identification portion 17, the temporary holding portion 18, a front cassette 51 that will be described later, and a transport mechanism 20 that transports banknotes between a plurality of storages 52.

The transport mechanism 20 has a deposit transport path 21 extending from the rear end portion of the deposit portion 11. The deposit transport path 21 transports the banknotes fed from the deposit portion 11 to the identification portion 17. The deposit transport path 21 has an inclined transport path portion 22 extending rearward and downward from the deposit portion 11, and a horizontal transport path portion 23 extending horizontally rearward from the rear end of the inclined transport path portion 22. The deposit transport path 21 is connected to the identification portion 17 at the rear end portion of the horizontal transport path portion 23.

The transport mechanism 20 has an internal transport path 25 in the identification portion 17. The internal transport path 25 is disposed on the same straight line as the horizontal transport path portion 23 of the deposit transport path 21, and extends horizontally rearward from the rear end portion of the horizontal transport path portion 23. The internal transport path 25 continuously transports banknotes rearward from the horizontal transport path portion 23. The identification portion 17 identifies the authenticity, soundness, denomination, double feeding, skewing, or the like of the banknotes being transported in the internal transport path 25.

The transport mechanism 20 has a straight transport path 26 extending horizontally rearward from the rear end portion of the internal transport path 25 of the identification portion 17. The rear end portion of the straight transport path 26 is connected to the temporary holding portion 18. The straight transport path 26 continuously transports banknotes rearward from the internal transport path 25. The horizontal transport path portion 23 of the deposit transport path 21, the internal transport path 25, and the straight transport path 26 are aligned on the same straight line. The identification portion 17 and the temporary holding portion 18 are connected by the straight transport path 26 which is a straight line. For example, the banknotes set in the deposit portion 11 are transported from the deposit portion 11 toward the identification portion 17 through the deposit transport path 21. The banknotes are identified by the identification portion 17 and then transported to the temporary holding portion 18 through the straight transport path 26. As described above, the identification portion 17 and the temporary holding portion 18 have the installation positions of substantially the same height, and the straight transport path 26 extends in the lateral direction, specifically, in the horizontal direction, and connects the identification portion 17 and the temporary holding portion 18.

Figure 2:
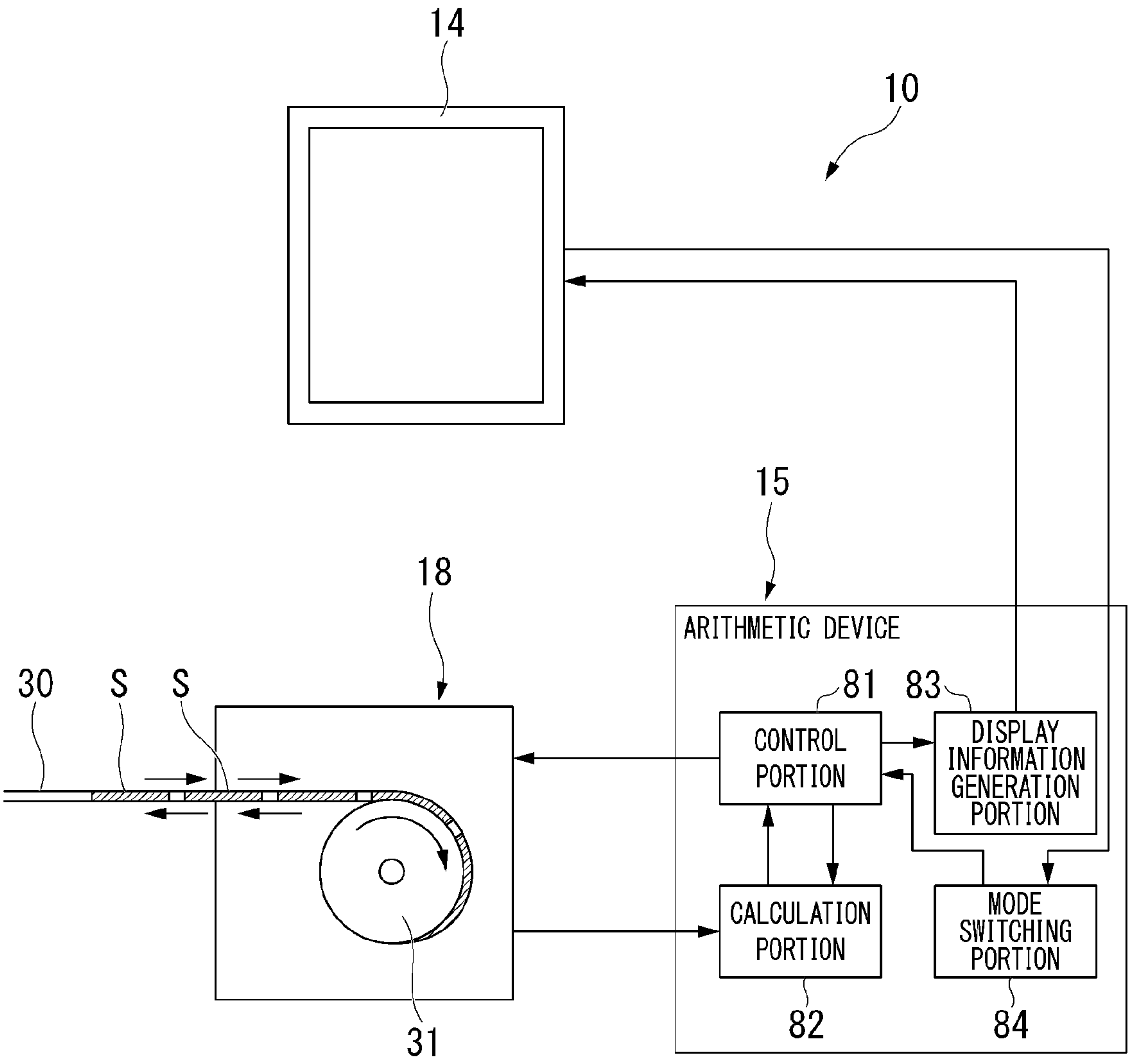
FIG. 2 is a block diagram showing a control procedure of the paper sheet processing device according to the embodiment.

The temporary holding portion 18 holds banknotes. That is, the temporary holding portion 18 takes in and stores the banknotes transported by the straight transport path 26 one by one. The temporary holding portion 18 feeds the stored banknotes one by one to the straight transport path 26. The temporary holding portion 18, for example, holds the banknotes set in the deposit portion 11 and feeds the held banknotes. As shown in FIG. 2, the temporary holding portion 18 is a winding storage type in which the banknotes S are wound one by one at intervals around a drum 31 (rotating body) together with a tape 30 and stored. Accordingly, the banknotes S on hold are unwound from the drum 31 together with the tape 30, and are fed while being counted one by one at intervals. In other words, the temporary holding portion 18 has the drum 31 configured to be able to wind the banknotes S one by one, and the drum 31 feeds the wound banknotes S one by one.

The temporary holding portion 18 feeds the banknotes S in the reverse order of the order at the time of holding. Accordingly, although the banknotes S of a plurality of denominations are randomly mixed and held, the arithmetic device 15 can detect the denomination of each banknote S that is held from the identification result of the identification portion 17. Accordingly, the arithmetic device 15 can detect the denomination of each banknote S to be fed from the temporary holding portion 18.

The drum 31 of the temporary holding portion 18 is provided to be rotatable around a rotation axis. In the temporary holding portion 18, the tape 30 is wound up by rotating the drum 31 in one direction around the rotation axis (clockwise in FIGS. 1 and 2). In the drum 31, the tape 30 is wound up so that the banknotes S are sandwiched and retained one by one between the wound tapes 30. Further, in the temporary holding portion 18, the drum 31 is rotated in the other direction around the rotation axis (counterclockwise in FIGS. 1 and 2) and the wound tape 30 is sent out, so that the banknotes S retained between the tapes 30 that are sent out are fed out one by one. In the embodiment, for example, the maximum number of banknotes S that can be held in the temporary holding portion 18 is 1000.

As shown in FIG. 1, the transport mechanism 20 has a dispensing transport path 35 that branches upward from an intermediate position of the straight transport path 26. The dispensing transport path 35 is connected to the dispensing portion 12. By branching the dispensing transport path 35, the straight transport path 26 is divided into a front side transport path portion 26*a* on the front side from the branch position of the dispensing transport path 35, and the rear side transport path portion 26*b* on the rear side from the branch position of the dispensing transport path 35. The banknotes S can move back and forth between the front side transport path portion 26*a* and the rear side transport path portion 26*b*. That is, the banknotes S can be transported from the front side transport path portion 26*a* to the dispensing transport path 35 between the front side transport path portion 26*a* and the dispensing transport path 35. Further, the banknotes S can be transported from the rear side transport path portion 26*b* to the dispensing transport path 35 between the rear side transport path portion 26*b* and the dispensing transport path 35.

The dispensing transport path 35 transports the banknotes S transported along the straight transport path 26 to the dispensing portion 12. The dispensing transport path 35 has a vertical transport path portion 35*a* extending vertically upward from an intermediate position of the straight transport path 26, a horizontal transport path portion 35*b* extending horizontally forward from the upper end portion of the vertical transport path portion 35*a*, a vertical transport path portion 35*c* extending vertically upward from the front end portion of the horizontal transport path portion 35*b*, and a horizontal transport path portion 35*d* extending horizontally forward from the upper end portion of the vertical transport path portion 35*c* and connected to the dispensing portion 12.

Here, the dispensing portion 12 diagonally accumulates the banknotes S fed from the horizontal transport path portion 35*d* of the dispensing transport path 35, from the front side and the lower side to the rear side and the upper side. The banknotes S accumulated in the dispensing portion 12 are taken out from the dispensing portion 12 to the outside. The dispensing transport path 35, for example, branches and transports the banknotes S fed from the temporary holding portion 18 to the straight transport path 26 upward from the middle of the straight transport path 26, and transports the banknotes S to the dispensing portion 12.

The deposit portion 11, the dispensing portion 12, the operation display portion 14, the identification portion 17 including the internal transport path 25, the temporary holding portion 18, the deposit transport path 21, the straight transport path 26, and the dispensing transport path 35 are provided in an upper portion unit 41 that constitutes the upper portion of the paper sheet processing device 10.

The lower portion unit 42 is positioned below the upper portion unit 41 and constitutes a lower portion from an intermediate portion of the paper sheet processing device 10 in the height direction. The lower portion unit 42 is provided with a front cassette 51 at the front portion position. Behind the front cassette 51, a total of eight storages 52 are provided, in two upper and lower stages and four front and rear rows. Among the eight storages 52, the four of the upper stage are positioned at substantially the same height. Among the eight storages 52, the four of the lower stage are positioned at substantially the same height. The height of the front cassette 51 is equivalent to the height of the two storages 52. The front cassette 51 is provided to overlap with the storages 52 of the two upper and lower stages in the height direction.

The transport mechanism 20 has an up and down transport path 55 that branches downward from an intermediate position of the horizontal transport path portion 23 of the deposit transport path 21. The up and down transport path 55 extends vertically downward from the horizontal transport path portion 23 and is connected to the front cassette 51. By branching the up and down transport path 55, the horizontal transport path portion 23 of the deposit transport path 21 is divided into the front side constituent portion 23*a* on the front side from the branch position of the up and down transport path 55, and the rear side constituent portion 23*b* on the rear side from the branch position of the up and down transport path 55. Between the front side constituent portion 23*a* and the rear side constituent portion 23*b*, the banknotes S can be transported from the front side constituent portion 23*a* to the rear side constituent portion 23*b*. The banknotes S can move back and forth between the up and down transport path 55 and the rear side constituent portion 23*b*. The up and down transport path 55 branches and transports, for example, the banknotes S, which are fed from the temporary holding portion 18 to the straight transport path 26 and then passed through the identification portion 17, downward from the middle of the deposit transport path 21 on the side opposite to the straight transport path 26 of the identification portion 17, and stores the banknotes S in the front cassette 51.

The front cassette 51 can take in and store the banknotes S one by one. The front cassette 51 can feed the stored banknotes S one by one. The front cassette 51 is an accumulation storage type in which the banknotes S are accepted from the upper portion and are accumulated and stored horizontally from the bottom to the top, and the stored banknotes S are fed from the upper end portion. The front cassette 51 of the accumulation storage type has significantly higher storage efficiency of the banknotes S than the winding storage type such as the temporary holding portion 18 and the storage 52 that will be described later. On the other hand, the winding storage type such as the temporary holding portion 18 and the storage 52 that will be described later is less likely to cause double feeding of the banknotes S than the front cassette 51 of the accumulation storage type. Accordingly, in the winding storage type, the held banknotes S can be accurately separated one by one and fed at intervals.

The transport mechanism 20 has a storage transport path 57 that branches rearward from an intermediate position of the up and down transport path 55. The storage transport path 57 extends horizontally rearward from the up and down transport path 55, then extends downward near the rear end portion of the paper sheet processing device 10, and is connected to the storage 52 of the rear end upper stage. The storage transport path 57 is also connected to the storage 52 at the rear end lower stage via the storage 52. By branching the storage transport path 57, the up and down transport path 55 is divided into an upper side transport path portion 55*a* on the upper side from the branch position of the storage transport path 57, and a lower side transport path portion 55*b* on the lower side from the branch position of the storage transport path 57.

The transport mechanism 20 has three branch transport paths 61, 62, and 63 that branch downward from an intermediate position of the storage transport path 57. The branch transport paths 61, 62, and 63 are connected to the storages 52 at the upper stage in the front side three rows. Each of the branch transport paths 61, 62, and 63 is connected to one of the storages 52 of the lower stage in the same row via one of the storages 52 of the upper stage.

All of the eight storages 52 are of a winding storage type in which the banknotes S are wound around the drum 71 together with tape one by one at intervals and stored. The eight storages 52 unwind the held banknotes S together with the tape from the drum 71 and feed the banknotes S while counting the banknotes S one by one at intervals. The storage 52 of the winding storage type feeds the banknotes S in the reverse order with respect to the order at the time of holding. Accordingly, although the banknotes S of a plurality of denominations are randomly mixed and stored together, the arithmetic device 15 can detect the denomination of each banknote S to be stored from the identification result of the identification portion 17. Accordingly, the arithmetic device 15 can detect the denomination of each banknote S to be fed from the storage 52.

The storage transport path 57 and the branch transport paths 61, 62, and 63, for example, branch and transport the banknotes S downward from the middle of the deposit transport path 21 after the banknotes S are fed from the temporary holding portion 18 to the straight transport path 26 and passed through the identification portion 17. After that, these transport paths are branched and transported rearward from the middle of the up and down transport path 55, and are selectively stored in the eight storages 52. The eight storages 52 can be set as, for example, all eight storages as single denomination storages that store only the single denomination banknotes S for which each is set. Further, some of the eight storages 52 can be set as single denomination storages that store only the single denomination banknotes S for which each is set, and the remainder can also be set as denomination mixing storages that store the banknotes S of a plurality of denominations by denomination mixing.

The lower portion unit 42 is provided with the front cassette 51, the eight storages 52, the lower portion of the upper side transport path portion 55*a* of the up and down transport path 55, the lower side transport path portion 55*b*, the storage transport path 57, and the branch transport paths 61 to 63. The upper portion of the upper side transport path portion 55*a* of the up and down transport path 55 is provided in the upper portion unit 41.

The lower portion unit 42 has a housing 75 that has a rectangular parallelepiped box-shape and opens in the front, a unit main body 76 that is provided with eight storages 52 and disposed in the housing 75, and a door body 77 that opens and closes a front portion opening of the housing 75. The front cassette 51 is detachably provided with respect to the unit main body 76.

As shown in FIG. 2, the arithmetic device 15 includes a control portion 81, a calculation portion 82, a display information generation portion 83, and a mode switching portion 84. The control portion 81 performs the drive control of the deposit portion 11, the temporary holding portion 18, the transport mechanism 20, the front cassette 51, and the plurality of storages 52 shown in FIG. 1 of the paper sheet processing device 10. The calculation portion 82 calculates the number of banknotes S, or the like that can be held in the temporary holding portion 18. The display information generation portion 83 generates display information to be displayed on the operation display portion 14. The mode switching portion 84 switches the operation mode of the paper sheet processing device 10 according to the operation input to the operation display portion 14.

The control portion 81 performs, for example, the feed control of the banknotes S in the deposit portion 11, the feed control of the banknotes S in the temporary holding portion 18, the transport control of the banknotes S set in the deposit portion 11 and fed from the deposit portion 11 by the transport mechanism 20, and the transport control of the banknotes S fed from the temporary holding portion 18 by the transport mechanism 20. The control portion 81 further performs, for example, the control of batch processing in which a batch number of the banknotes S held in the temporary holding portion 18 are fed, and divided and dispensed to the dispensing portions 12, or the like. In the batch processing, the control portion 81 holds, in the temporary holding portion 18, as many of the banknotes S as possible with the number calculated by the calculation portion 82 that can be held in the temporary holding portion 18 among the banknotes S set in the deposit portion 11.

Next, the main operation of the paper sheet processing device 10 according to the present embodiment will be described.

The mode switching portion 84 of the arithmetic device 15 switches the operation mode of the paper sheet processing device 10 according to the operation input to the operation display portion 14. In the embodiment, the mode switching portion 84 switches the operation mode among the storage mode, the dispensing mode, and the counting mode. The storage mode is a mode in which a plurality of banknotes S inserted into the deposit portion 11 are classified by denomination and distributed and stored in the storage 52 determined for each denomination. The dispensing mode is a mode in which the banknotes S can be dispensed from the plurality of storages 52 and taken out to the dispensing portion 12. The counting mode is a mode in which, from the plurality of banknotes S inserted into the deposit portion 11, the banknotes S of the same specific denomination are counted into predetermined batch numbers, divided for each batch number, and dispensed to the dispensing portion 12.

In other words, the paper sheet processing device 10 counts the banknotes S among the plurality of banknotes S inserted into the deposit portion 11 into a predetermined batch number in the counting mode and transports the banknotes S to the dispensing portion 12, which is repeated as appropriate. In the storage mode, the paper sheet processing device 10 classifies and stores the plurality of banknotes S inserted into the deposit portion 11 for each predetermined type. In the dispensing mode, the paper sheet processing device 10 performs dispensing such that the designated type of the banknotes S can be taken out to the dispensing portion 12. The paper sheet processing device 10 is switched among the storage mode, the dispensing mode, and the counting mode by the mode switching portion 84 according to an operation performed on the operation display portion 14 by the operator. The operation mode of the paper sheet processing device 10 is not limited to these three operation modes, and may have other operation modes.

When the mode switching portion 84 switches the paper sheet processing device 10 to the storage mode according to the operation input to the operation display portion 14, the control portion 81 performs deposit processing and storage processing, or deposit processing and return processing corresponding to the operation input to the operation display portion 14 as follows.

[Deposit Processing]

The insertion of the banknotes S into the deposit portion 11 from the outside is detected by a sensor (not shown). In this state, when the operation of starting the deposit processing is input to the operation display portion 14, the paper sheet processing device 10 is controlled by the control portion 81, and transports the banknotes S by the deposit portion 11 and the transport mechanism 20 through the deposit processing route shown by a thick line in FIG. 3.

The deposit portion 11 separates the banknotes S one by one and feeds the banknotes S at a predetermined interval. The fed banknotes S are transported by the deposit transport path 21 of the transport mechanism 20, the internal transport path 25 of the identification portion 17, and the front side transport path portion 26*a* of the straight transport path 26. The identification portion 17 identifies the banknotes S during transportation on the internal transport path 25. The banknotes S that the identification portion 17 identifies as acceptable are transported from the front side transport path portion 26*a* to the rear side transport path portion 26*b* of the straight transport path 26. The rear side transport path portion 26*b* transports the banknotes S to the temporary holding portion 18 and holds the banknotes S in the temporary holding portion 18 (see the thick solid line in FIG. 3). On the other hand, the banknotes S identified as unacceptable by the identification portion 17 are transported from the front side transport path portion 26*a* of the straight transport path 26 to the dispensing transport path 35, and the dispensing transport path 35 transports the banknotes S to the dispensing portion 12 (see the thick solid line to the thick dashed line in FIG. 3).

Here, since the deposit portion 11 separates and feeds the banknotes S accumulated in the thickness direction, there is a possibility of a transport defect such as double feeding and skewing of the banknotes S occurring at the time of feeding. The identification portion 17 also identifies the banknotes S with such a transport defect as unacceptable, and the transport mechanism 20 transports the banknotes S to the dispensing portion 12. When there are banknotes S to be transported to the dispensing portion 12 during the deposit processing, according to this, the control portion 81 stops the temporary holding portion 18 and performs control so that the take-in interval between the banknotes S held in the temporary holding portion 18 and the banknotes S is constant.

In a state where all the banknotes S inserted into the deposit portion 11 are transported to either the temporary holding portion 18 or the dispensing portion 12, the operation display portion 14 displays amount information such as the number and the total amount for each denomination of the banknotes S that are temporarily held in the temporary holding portion 18 from the identification result of the identification portion 17. The banknotes S transported to the dispensing portion 12 can be taken out to the outside. In addition to the dispensing portion 12, a reject portion that allows the banknotes S to be taken out to the outside may be provided, and the unacceptable banknotes S may be transported to the reject portion.

[Storage Processing]

Figure 4:
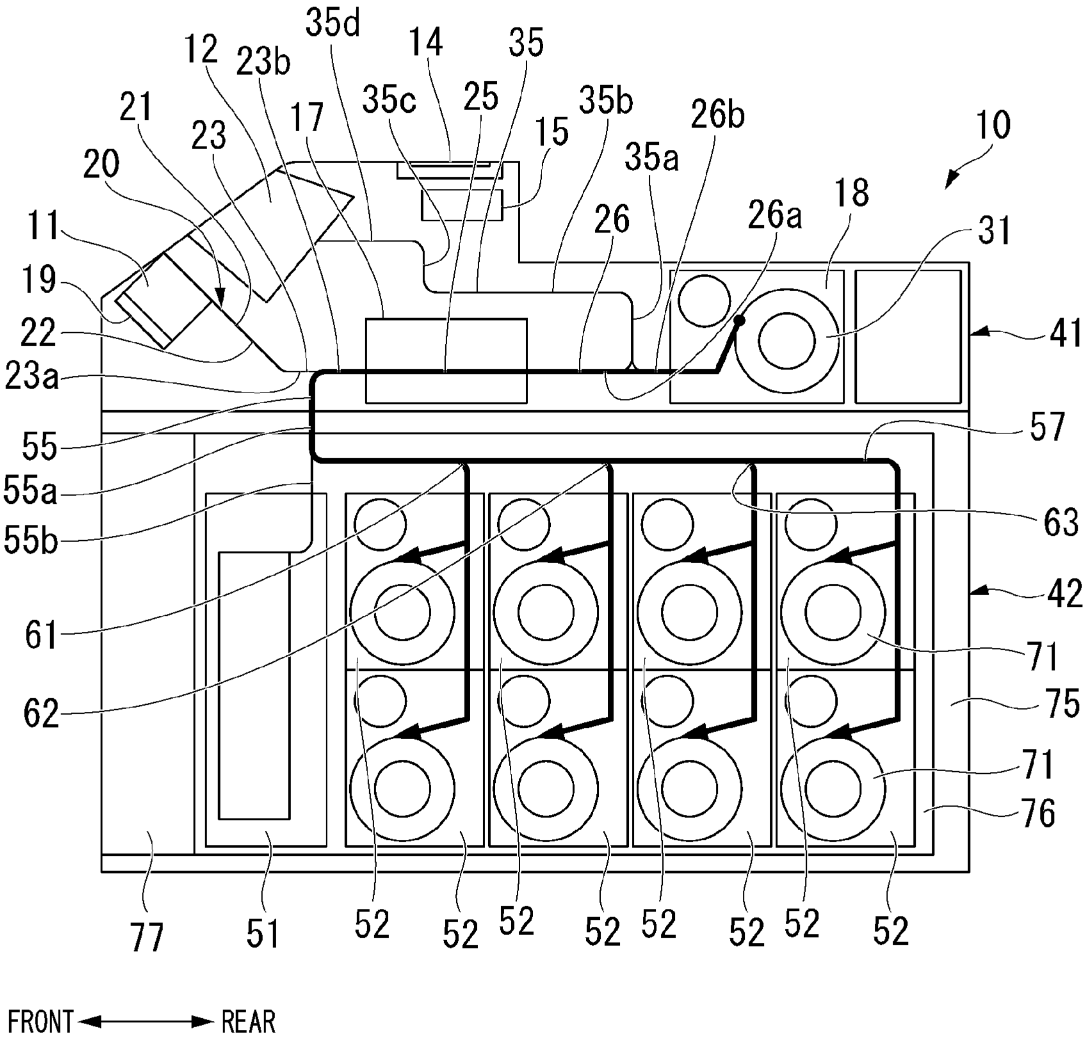
FIG. 4 is a side view showing a storage processing route in the paper sheet processing device according to the embodiment.

After the amount information after the deposit processing is displayed on the operation display portion 14, the operator inputs the approval operation to the operation display portion 14. In response to this operation, the paper sheet processing device 10 is controlled by the control portion 81, and the banknotes S are transported by the temporary holding portion 18, the transport mechanism 20, and the eight storages 52 through the storage processing route shown by the thick line in FIG. 4.

That is, the temporary holding portion 18 feeds the temporarily held banknotes S one by one at intervals. The fed banknotes S are transported by the straight transport path 26, the internal transport path 25 of the identification portion 17, the rear side constituent portion 23*b* of the deposit transport path 21, the upper side transport path portion 55*a* of the up and down transport path 55, and the storage transport path 57. The identification portion 17 identifies the banknotes S during transportation on the internal transport path 25. Based on the identification result of the identification portion 17, driving along an appropriate transport path among the storage transport path 57 and the branch transport paths 61 to 63 is performed, and the banknotes S are distributed to the corresponding storage among the eight storages 52. The distributed banknotes S are stored in the corresponding one of the eight storages 52.

Here, since the temporary holding portion 18 is a winding storage type, there is basically no possibility of generating a transport defect such as double feeding or skewing of the banknotes S at the time of feeding. Further, there is basically no occurrence of the banknotes S fed by the temporary holding portion 18 being determined as non-storable by the identification portion 17.

[Return Processing]

Figure 5:
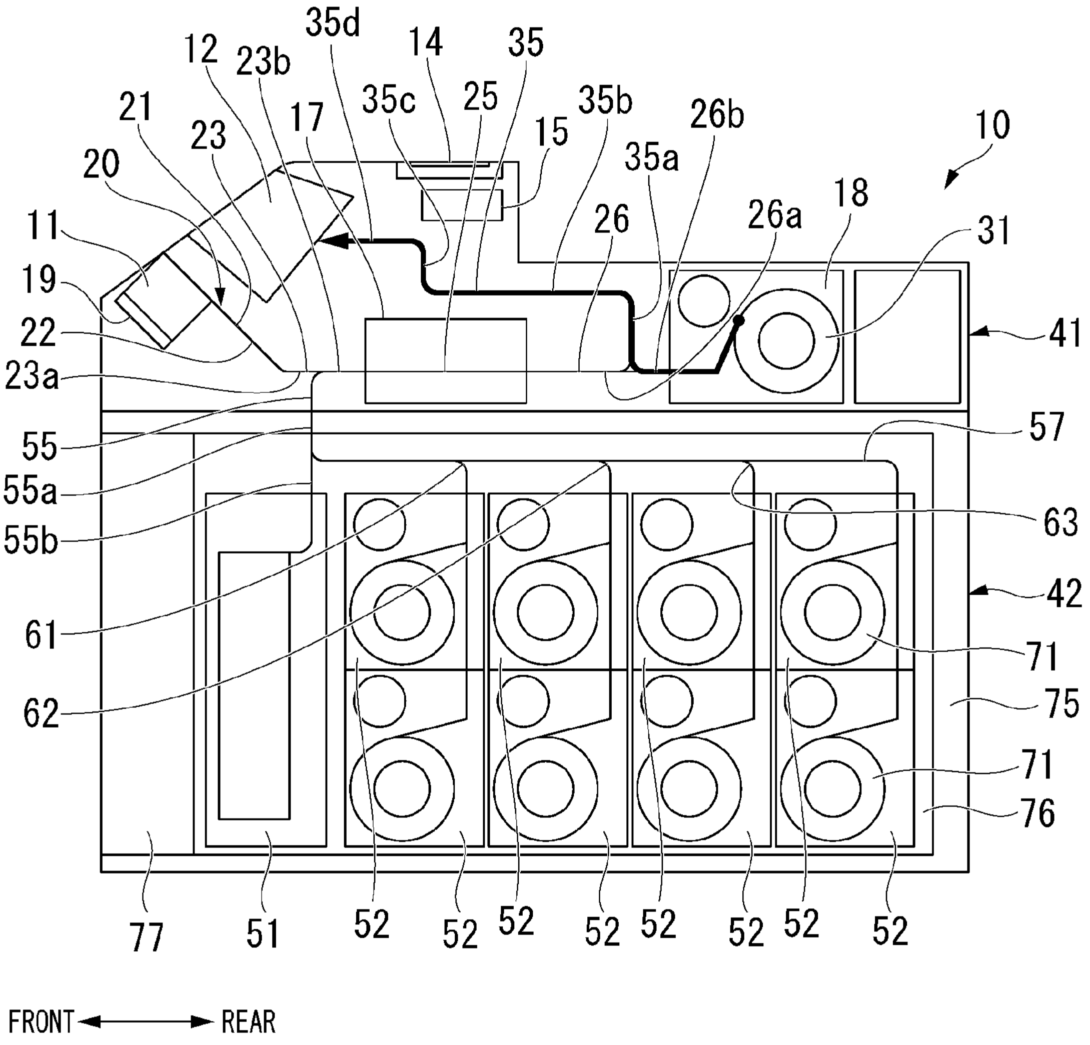
FIG. 5 is a side view showing a return processing route and a return path processing route of batch processing in the paper sheet processing device according to the embodiment.

When the operator inputs a return operation to the operation display portion 14 after the amount information after the deposit processing is displayed on the operation display portion 14, the paper sheet processing device 10 is controlled by the control portion 81 and transports the banknotes S by the temporary holding portion 18, the transport mechanism 20, and the dispensing portion 12 through the return processing route shown by the thick line in FIG. 5.

That is, the temporarily held banknotes S are fed one by one at intervals by the temporary holding portion 18, and the rear side transport path portion 26*b* of the straight transport path 26 and the dispensing transport path 35 transport the banknotes S to the dispensing portion 12. The banknotes S transported to the dispensing portion 12 can be taken out to the outside.

When the mode switching portion 84 switches the paper sheet processing device 10 to the dispensing mode according to the operation input to the operation display portion 14, the control portion 81 performs the dispensing processing corresponding to the operation input to the operation display portion 14 as follows.

[Dispensing Processing]

Figure 6:
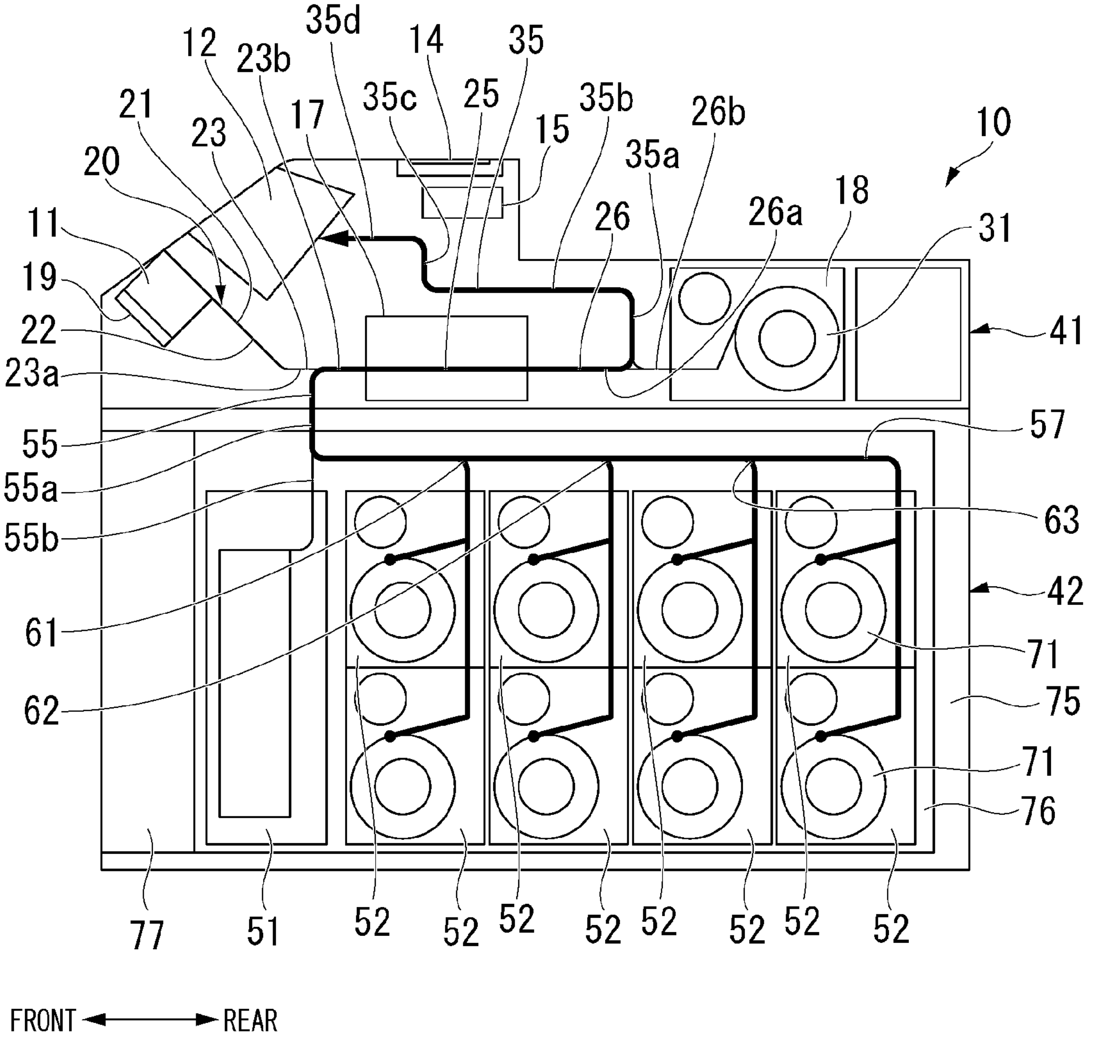
FIG. 6 is a side view showing a dispensing processing route in the paper sheet processing device according to the embodiment.

The dispensing processing is performed by inputting the dispensing processing selection operation together with the amount information of the banknotes S to be dispensed to the operation display portion 14. In this dispensing processing, when the banknotes S are dispensed from the storage 52 set as the single denomination storage, the paper sheet processing device 10 is controlled by the control portion 81, and transports the banknotes S from the storage 52 in which the banknotes S of the denomination to be dispensed are stored, by the transport mechanism 20 and the dispensing portion 12 through the dispensing processing route shown by the thick line in FIG. 6.

That is, the corresponding storage among the storages 52 separates and counts the stored banknotes S one by one, and feeds the banknotes S at intervals. The fed banknotes S are transported to the dispensing portion 12 along an appropriate transport path among the branch transport paths 61 to 63, the storage transport path 57, the upper side transport path portion 55*a* of the up and down transport path 55, the rear side constituent portion 23*b* of the deposit transport path 21, the internal transport path 25 of the identification portion 17, the front side transport path portion 26*a* of the straight transport path 26, and the dispensing transport path 35. Here, since all the storages 52 are of the winding storage type, there is basically no occurrence of a transport defect such as double feeding and skewing of the banknotes S at the time of feeding, and there is basically no occurrence of the banknotes S fed by the storage 52 being determined as non-dispensing by the identification portion 17. The banknotes S transported to the dispensing portion 12 can be taken out to the outside.

Here, at the time of this dispensing processing, banknotes that are fed from the corresponding storage 52 and identified as damaged banknotes by the identification portion 17 are stored in the most inner side area of the winding of the temporary holding portion 18.

When the mode switching portion 84 switches the paper sheet processing device 10 to the counting mode according to the operation input to the operation display portion 14, the control portion 81 performs the batch processing corresponding to the operation input to the operation display portion 14 as follows.

[Batch Processing]

The batch processing is organization counting processing for counting and organizing the banknotes S. An input operation of the type information such as a denomination and a predetermined batch number Nk of the banknotes S is input to the operation display portion 14 as a batch processing target that is to be batch-processed. Here, the batch number Nk means the number of banknotes S that are bundled. The batch number may be predetermined by the operator or may be automatically set by the paper sheet processing device 10. When the input operation of the type information and the predetermined batch number Nk of the banknotes S are input as a batch processing target, the calculation portion 82 of the arithmetic device 15 performs the calculation of a maximum holdable number Nt of the banknotes S that can still be held in the temporary holding portion 18.

Specifically, based on a maximum holdable number Nmax of the banknotes S that can be physically held when the temporary holding portion 18 is empty, and a number Ndt of the banknotes S that are already held in the temporary holding portion 18 at the present time, the calculation portion 82 performs the calculation of the maximum holdable number Nt of the banknotes S that can still be held in the temporary holding portion 18.

Here, at the time of the dispensing processing, the temporary holding portion 18 stores the banknotes identified as damaged banknotes by the identification portion 17 in the most inner side area of the winding, and the number Ndt in this case is the number of damaged banknotes.

The holdable number Nt is calculated by subtracting the number Ndt of banknotes S already held in the temporary holding portion 18 at the present time from the maximum holdable number Nmax of the banknotes S in the temporary holding portion 18 (Nt=Nmax−Ndt). Accordingly, when no banknotes S are held in the temporary holding portion 18, the maximum holdable number Nmax of the temporary holding portion 18 is the holdable number Nt at the present time (Nmax=Nt). Information related to the holdable number Nt calculated by the calculation portion 82 is transmitted to the control portion 81. When the holdable number Nt received from the calculation portion 82 is less than the batch number Nk, the control portion 81 determines that the batch processing cannot be performed and causes the operation display portion 14 to display the same.

(Outbound Path Processing)

When the holdable number Nt received from the calculation portion 82 is greater than or equal to the batch number Nk, the control portion 81 performs the drive control of the deposit portion 11, the transport mechanism 20, and the temporary holding portion 18 based on the information related to the holdable number Nt on condition that the banknotes S of the deposit portion 11 are detected by the sensor (not shown). That is, the control portion 81 performs the outbound path processing of the batch processing in which the plurality of banknotes S inserted into the deposit portion 11 are transported by the outbound path processing route of the batch processing in the same manner as the deposit processing route shown by the thick line in FIG. 3.

Specifically, the deposit portion 11 separates the banknotes S one by one and feeds them at intervals. The fed banknotes S are transported by the deposit transport path 21 of the transport mechanism 20, the internal transport path 25 of the identification portion 17, and the front side transport path portion 26*a* of the straight transport path 26. The identification portion 17 identifies and counts the banknotes S during the transport in the internal transport path 25. The banknotes S identified as a batch processing target by the identification portion 17 are transported to the temporary holding portion 18 by the front side transport path portion 26*a* and the rear side transport path portion 26*b*, and held in the temporary holding portion 18 up to the holdable number Nt (see the thick solid line in FIG. 3).

At this time, the control portion 81 drives and controls the temporary holding portion 18 to wind the banknotes S transported by the transport mechanism 20 on the drum 31 together with the tape 30 one by one at intervals and hold the banknotes S. At that time, the banknotes S identified as the batch processing target are held on the front side of the winding of the banknotes S that are already being held, which is counted in the number Ndt. As a result, for example, when the deposit portion 11 has a number of the banknotes S that are a batch processing target that exceeds the batch number Nk, the temporary holding portion 18 temporarily holds the number of banknotes S that are a batch processing target that exceeds the batch number Nk.

Figure 3:
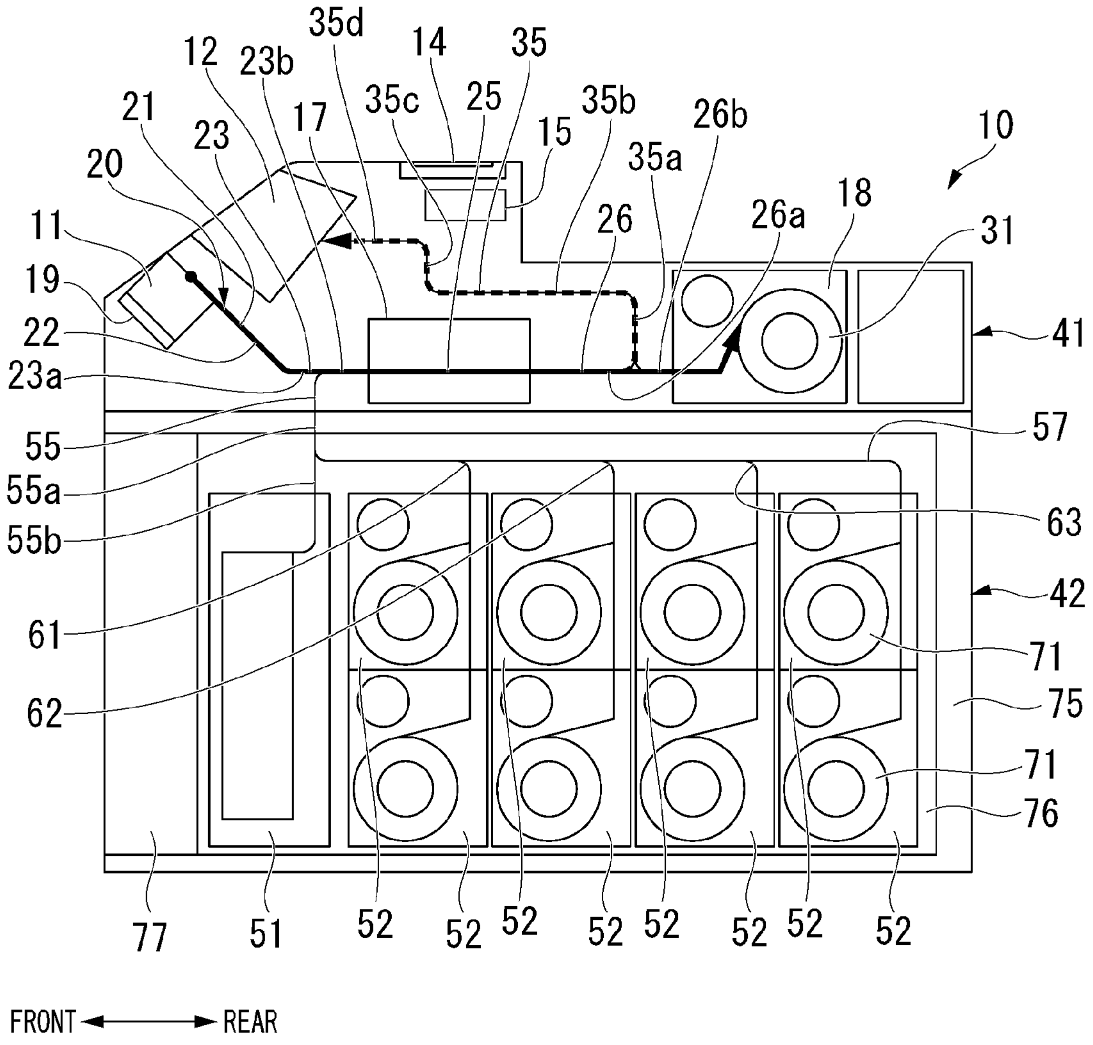
FIG. 3 is a side view showing a deposit processing route and an outbound path processing route of batch processing in the paper sheet processing device according to the embodiment.

On the other hand, the banknotes S identified by the identification portion 17 as a non-batch-processing target are transported from the front side transport path portion 26*a* of the straight transport path 26 to the dispensing portion 12 by the dispensing transport path 35 (see from the thick solid line to the thick dashed line in FIG. 3). Here, in addition to the banknotes S whose type information is different from the designated type, the identification portion 17 identifies the banknotes S with transport defects as a non-batch-processing target, and the transport mechanism 20 transports the banknotes S to the dispensing portion 12. In addition to the dispensing portion 12, a reject portion that allows the banknotes S to be taken out to the outside may be provided, and the banknotes S identified as a non-batch-processing target may be transported to the reject portion. When there are banknotes S to be transported to the dispensing portion 12, according to this, the control portion 81 stops the temporary holding portion 18 and performs control so that the interval between the banknotes S held in the temporary holding portion 18 is constant.

In the outbound path processing of this time, at the timing when the number of banknotes S held in the temporary holding portion 18 is expected to reach the holdable number Nt, or at the timing when a state in which all the banknotes S inserted into the deposit portion 11 are transported to any of the temporary holding portion 18 and the dispensing portion 12 is reached, the control portion 81 stops the deposit portion 11, the transport mechanism 20, and the temporary holding portion 18. At this time, the banknotes S transported to the dispensing portion 12 can be taken out to the outside.

Then, the display information generation portion 83 of the arithmetic device 15 generates information to be displayed on the operation display portion 14 based on the identification result of the identification portion 17 and transmits the information to the operation display portion 14. Here, the display information generation portion 83 generates operation screen information for displaying the operation button or the like when the operator uses the paper sheet processing device 10 on the operation display portion 14, and transmits the operation screen information to the operation display portion 14. As a result, the operation display portion 14 displays the operation screen used for the operation of the operator based on the operation screen information generated by the display information generation portion 83. Further, the display information generation portion 83 generates operation status information of the paper sheet processing device 10. For example, the operation status information includes information related to the number of banknotes S held in the temporary holding portion 18 in the outbound path processing of this time, and information related to the batch number Nk (for example, 100).

Here, as a specific example, a case where 375 ruble banknotes (RUB) that are a first type at the bottom and 410 US dollar banknotes (USD) that are a second type at the top are stacked and inserted on the deposit portion 11, and the ruble banknotes and US dollar banknotes are set as batch processing targets, will be described as an example. It is assumed that no banknotes S are transported to the dispensing portion 12 in the outbound path processing of the batch processing. In this case, in the outbound path processing, 410 US dollar banknotes are held in the temporary holding portion 18 further ahead of the winding than the number Ndt of banknotes S that are already held, and 375 ruble banknotes are held in front of this winding.

Figure 7:
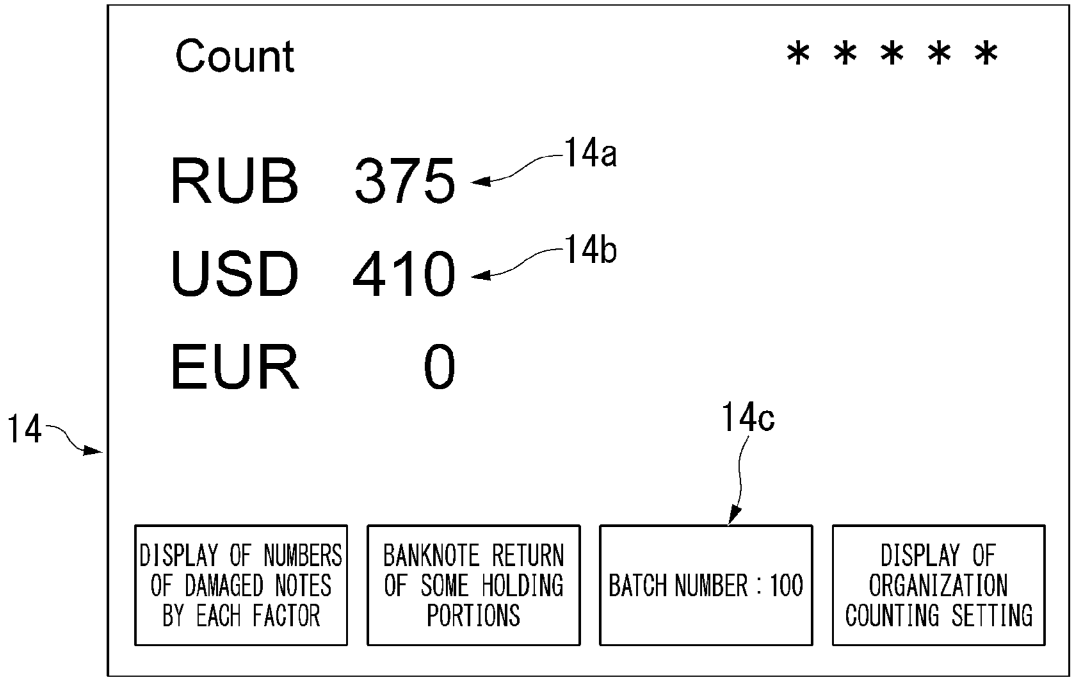
FIG. 7 is a front view showing a display example of an operation display portion in the paper sheet processing device according to the embodiment.

Further, in this case, the result of the outbound path processing of the batch processing displayed on the operation display portion 14 is as shown in FIG. 7. That is, as a result of identification and counting by the identification portion 17 in the outbound path processing of the batch processing, it is displayed that 375 ruble banknotes are held in the temporary holding portion 18 in a display area 14*a*, and it is displayed that 410 US dollar banknotes are held in a display area 14*b*. Further, in FIG. 7, it is displayed in a display area 14*c* that the batch number Nk of the banknotes S is set to 100.

Here, when it is determined that all of the number of banknotes S of the first type and the number of banknotes S of the second type held in the temporary holding portion 18 in the outbound path processing of this time are greater than or equal to the batch number Nk (first state), the display information generation portion 83 displays the possibility of the dispensing of the banknotes S having the batch number Nk by a display mode in which characters representing the batch number Nk (for example, "100") to be displayed in the display area 14*c* of the operation display portion 14 are displayed in black.

On the other hand, when it is determined that any of the number of banknotes S of the first type and the number of banknotes S of the second type held in the temporary holding portion 18 in the outbound path processing of this time is less than the batch number Nk (second state), the display information generation portion 83 displays the impossibility of the dispensing of the banknotes S having the batch number Nk by a display mode in which characters representing the batch number Nk (for example, "100") to be displayed in the display area 14*c* of the operation display portion 14 are, for example, displayed in orange that is different from a case where the number of banknotes S held in the temporary holding portion 18 at the present time is greater than or equal to the batch number Nk.

That is, the display information generation portion 83 displays the operation status of the paper sheet processing device 10 on the operation display portion 14 in display modes between the first state in which the number of banknotes S held in the temporary holding portion 18 in the outbound path processing of this time is greater than or equal to the predetermined batch number Nk, and the second state in which the number of banknotes S held in the temporary holding portion 18 in the outbound path processing of this time is less than the predetermined batch number Nk. When the number of banknotes S held in the temporary holding portion 18 in the outbound path processing of this time is less than the batch number Nk, the display mode is not limited to the above-mentioned display mode, and for example, the characters representing the batch number may be blinked, or the display color may be lightened, or a notification by voice or the like that it is less than the batch number may be provided.

For example, when 375 ruble banknotes and 410 US dollar banknotes are held in the temporary holding portion 18 as described above and the predetermined batch number Nk is 100, by the return path processing that will be described later of the batch processing, for the ruble banknotes, three groups of 100 and one group of 75 are transported to the dispensing portion 12. In the same manner, for the US dollar banknotes, four groups of 100 and one group of 10 are transported to the dispensing portion 12. In this case, a display mode in which characters representing the batch number Nk to be displayed in the display area 14*c* are displayed in black is used.

When three groups of 100 ruble banknotes and four groups of 100 US dollar banknotes are paid out to the dispensing portion 12, a display mode in which characters representing the batch number Nk to be displayed in the display area 14*c* are displayed in black may be used, and when the remaining one group of 75 ruble banknotes and the remaining one group of 10 US dollar banknotes are paid out to the dispensing portion 12, a display mode in which characters representing the batch number Nk to be displayed in the display area 14*c* are displayed in orange may be used.

Figure 8:
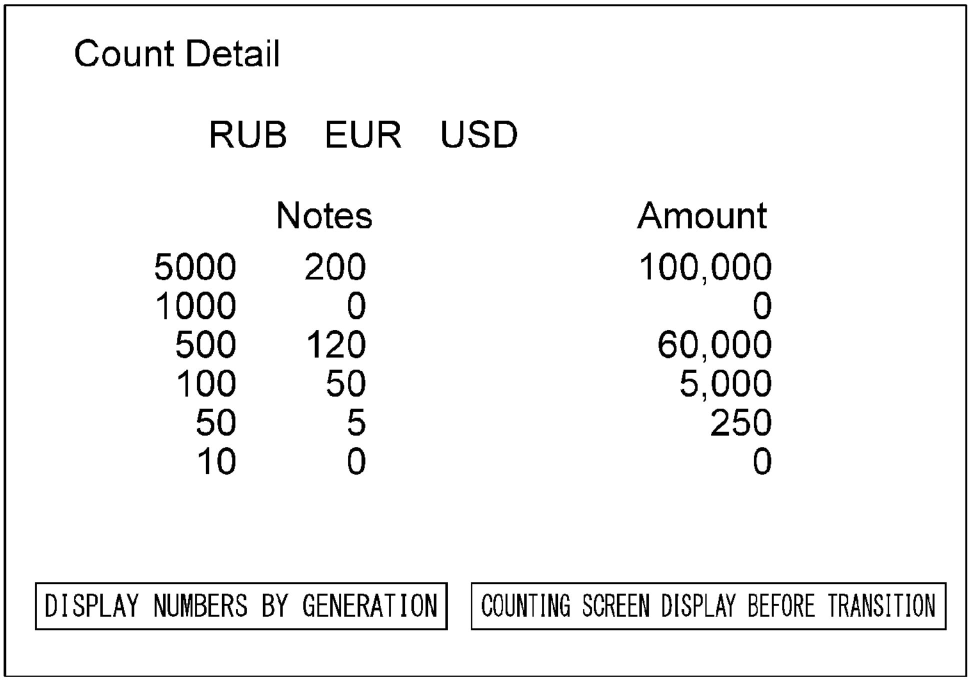
FIG. 8 is a front view showing a display example of the operation display portion in the paper sheet processing device according to the embodiment.

Here, as shown in FIG. 7, in the operation display portion 14, by touching either one of the display areas 14*a* and 14*b* displaying the text of the banknotes ("RUB 375", "USD 410"), details of the holding status of each banknote are displayed (see FIG. 8).

For example, FIG. 8 is a diagram describing an example of a detailed screen when the display area 14*a* displaying the text "RUB" of the ruble banknotes is touched. As shown in FIG. 8, when the display area 14*a* displaying the text of the ruble banknotes "RUB" is touched, the holding number and the holding amount for each denomination of the ruble banknotes are displayed on the operation display portion 14. In the embodiment, the ruble banknotes held in the temporary holding portion 18 are divided into 6 denominations of 5000p, 1000p, 500p, 100p, 50p, and 10p, and it is displayed that 200 5000p, 120 500p, 50 100p, 5 50p, and 0 1000p and 10p, for a total of 375, are held in the temporary holding portion 18.

(Return Path Processing)

After the display of the operation display portion 14 after the outbound path processing described above, the operator inputs the execution operation of the return path processing to the operation display portion 14. In response to this, the control portion 81 performs the drive control of the temporary holding portion 18 and the transport mechanism 20, and performs the return path processing of the batch processing that transports the ruble banknotes S that are the first type for each batch number Nk from the temporary holding portion 18 to the dispensing portion 12 in a return path processing route of the batch processing in the same manner as the return processing route shown by the thick line in FIG. 5.

That is, the temporarily held banknotes S are separated one by one and fed at intervals by the temporary holding portion 18, and transported to the dispensing portion 12 in the rear side transport path portion 26*b* of the straight transport path 26 and the dispensing transport path 35. The banknotes S transported to the dispensing portion 12 are accumulated in the dispensing portion 12.

When the banknotes S fed by the temporary holding portion 18 reach 100, which is the batch number Nk, the control portion 81 temporarily stops the temporary holding portion 18, and temporarily stops the drive of the transport mechanism 20 at the timing when the banknotes S fed by the temporary holding portion 18 reach the batch number Nk at the dispensing portion 12. Then, the display information generation portion 83 displays, on the operation display portion 14, that the type of banknotes S dispensed to the dispensing portion 12 is the ruble banknotes, 100 that is the batch number Nk, and a display prompting the dispensing thereof. As a result, the operator takes the batch number Nk of ruble banknotes S in the dispensing portion 12 out of the dispensing portion 12.

Then, a sensor (not shown) detects that the banknotes S of the dispensing portion 12 are taken out, and the control portion 81 determines whether the total fed number, which is the total number of ruble banknotes S fed from the temporary holding portion 18 to the dispensing portion 12 in the batch processing of this time, reaches the holding number of ruble banknotes S held in the temporary holding portion 18 in the batch processing of this time.

That is, when it is determined that the total number of ruble banknotes S fed from the temporary holding portion 18 in the return path processing by that point in the batch processing of this time is less than the number of ruble banknotes S held in the temporary holding portion 18 in the outbound path processing of the batch processing of this time, and the difference between the total number and the number is greater than or equal to the batch number Nk, the control portion 81 performs the drive control of the temporary holding portion 18 and the transport mechanism 20 again in the same manner as described above, and transports the batch number Nk of ruble banknotes S of the first type to the dispensing portion 12 in the return path processing route of the batch processing shown by the thick line FIG. 5.

After that, the display information generation portion 83 displays, on the operation display portion 14, that the type of banknotes S dispensed to the dispensing portion 12 is the ruble banknotes, 100 sheets the batch number Nk, and a display prompting the dispensing thereof. As a result, the operator takes the batch number Nk of ruble banknotes S in the dispensing portion 12 out of the dispensing portion 12.

By repeating such processing as appropriate, when it is determined that the total number of ruble banknotes S fed from the temporary holding portion 18 in the return path processing by that point in the batch processing of this time is less than the number of ruble banknotes S held in the temporary holding portion 18 in the outbound path processing of the batch processing of this time, and the difference between the total number and the number is less than the batch number Nk, the control portion 81 sets a display mode in which characters representing the batch number Nk to be displayed in the display area 14*c* are displayed in orange, having been displayed in black up to that point, performs the drive control of the temporary holding portion 18 and the transport mechanism 20 again in the same manner as described above, and transports all of the remaining ruble banknotes S held in the temporary holding portion 18 in the outbound path processing of the batch processing of this time, to the dispensing portion 12 in the return path processing route of the batch processing shown by the thick line FIG. 5.

Then, when the total fed number, which is the total number of banknotes S of the ruble currency fed from the temporary holding portion 18 to the dispensing portion 12, reaches the holding number of ruble banknotes held in the temporary holding portion 18 in the batch processing of this time, the control portion 81 stops the temporary holding portion 18, and stops the drive of the transport mechanism 20 at the timing when all the banknotes S fed by the temporary holding portion 18 are dispensed to the dispensing portion 12.

At the same time, the display information generation portion 83 displays, on the operation display portion 14, that the type of banknotes S dispensed to the dispensing portion 12 is the ruble banknotes, a fractional number not reaching the batch number Nk, 75 that is the number of banknotes, and a display prompting the dispensing thereof. As a result, the operator takes the ruble banknotes S of the fractional number in the dispensing portion 12 out of the dispensing portion 12.

Then, a sensor (not shown) detects that the banknotes S of the dispensing portion 12 are taken out, and the control portion 81 determines that the total fed number, which is the total number of ruble banknotes S fed from the temporary holding portion 18 to the dispensing portion 12 in the batch processing of this time, reaches the holding number of banknotes S of the ruble currency held in the temporary holding portion 18 in the batch processing of this time.

Then, again, a display mode in which characters representing the batch number Nk to be displayed in the display area 14*c* are displayed in black is used, the drive control of the temporary holding portion 18 and the transport mechanism 20 is performed in the same manner as described above, and the batch number Nk of banknotes S of the US dollar currency that is the second type are transported from the temporary holding portion 18 to the dispensing portion 12 in the return path processing route of the batch processing shown by the thick line in FIG. 5.

When the banknotes S fed by the temporary holding portion 18 reach 100, which is the batch number Nk, the control portion 81 temporarily stops the temporary holding portion 18, and temporarily stops the drive of the transport mechanism 20 at the timing when the banknotes S fed by the temporary holding portion 18 reach the batch number Nk at the dispensing portion 12. Then, the display information generation portion 83 displays, on the operation display portion 14, that the type of banknotes S dispensed to the dispensing portion 12 is the US dollar banknotes, 100 that is the batch number Nk, and a display prompting the dispensing thereof. As a result, the operator takes the batch number Nk of US dollar banknotes S in the dispensing portion 12 out of the dispensing portion 12.

Then, a sensor (not shown) detects that the banknotes S of the dispensing portion 12 are taken out. As a result, the control portion 81 determines whether the total fed number, which is the total number of US dollar banknotes S fed from the temporary holding portion 18 to the dispensing portion 12 in the batch processing of this time, reaches the holding number of US dollar banknotes S held in the temporary holding portion 18 in the batch processing of this time.

That is, it is determined that the total number of US dollar banknotes S fed from the temporary holding portion 18 in the return path processing by that point in the batch processing of this time is less than the number of US dollar banknotes S held in the temporary holding portion 18 in the outbound path processing of the batch processing of this time, and the difference between the total number and the number is greater than or equal to the batch number Nk. In this case, the control portion 81 performs the drive control of the temporary holding portion 18 and the transport mechanism 20 again in the same manner as described above, and transports 100, which is the batch number Nk, of the US dollar banknotes S that are the second type to the dispensing portion 12 in the return path processing route of the batch processing shown by the thick line FIG. 5.

After that, the display information generation portion 83 displays, on the operation display portion 14, that the type of banknotes S dispensed to the dispensing portion 12 is the US dollar banknotes, 100 that is the batch number Nk, and a display prompting the dispensing thereof. As a result, the operator takes out the batch number Nk of US dollar banknotes S in the dispensing portion 12 out of the dispensing portion 12.

By repeating such processing as appropriate, it is determined whether the total number of US dollar banknotes S fed from the temporary holding portion 18 in the return path processing by that point in the batch processing of this time is less than the number of US dollar banknotes S held in the temporary holding portion 18 in the outbound path processing of the batch processing of this time, and the difference between the total number and the number is less than the batch number Nk. When it is determined that the total number of US dollar banknotes S is less than the number of US dollar banknotes S, and the difference between the total number and the number is less than the batch number Nk, the control portion 81 sets a display mode in which characters representing the batch number Nk to be displayed in the display area 14*c* are displayed in orange, having been displayed in black up to that point. The control portion 81 performs the drive control of the temporary holding portion 18 and the transport mechanism 20 again in the same manner as described above, and transports all of the remaining US dollar banknotes S held in the temporary holding portion 18 to the dispensing portion 12 in the outbound path processing of the batch processing of this time, in the return path processing route of the batch processing shown by the thick line FIG. 5.

Next, the control portion 81 detects whether the total fed number, which is the total number of US dollar banknotes S fed from the temporary holding portion 18 to the dispensing portion 12, reaches the holding number of US dollar banknotes held in the temporary holding portion 18 in the batch processing of this time. When it is detected that the total fed number reaches the holding number of US dollar banknotes held in the temporary holding portion 18, the control portion 81 stops the temporary holding portion 18, and stops the drive of the transport mechanism 20 at the timing when all the banknotes S fed by the temporary holding portion 18 are dispensed to the dispensing portion 12.

At the same time, the display information generation portion 83 displays, on the operation display portion 14, that the type of banknotes S dispensed to the dispensing portion 12 is the US dollar banknotes, a fractional number not reaching the batch number Nk, 10 that is the number of banknotes, and a display prompting the dispensing thereof. As a result, the operator takes the fractional number of US dollar banknotes S in the dispensing portion 12 out of the dispensing portion 12.

Then, a sensor (not shown) detects that the banknotes S of the dispensing portion 12 are taken out. As a result, the control portion 81 determines that the total fed number, which is the total number of US dollar banknotes S fed from the temporary holding portion 18 to the dispensing portion 12 in the batch processing of this time, reaches the holding number of US dollar banknotes S held in the temporary holding portion 18 in the batch processing of this time.

As described above, 375 of the ruble banknotes and 410 of the US dollar banknotes inserted into the deposit portion 11 are divided into three groups of 100 of the ruble banknotes, one group of 75 of the ruble banknotes not reaching the batch number, four groups of 100 of the US dollar banknotes, and one group of 10 of the US dollar banknotes not reaching the batch number, and are dispensed.

The control portion 81 stops the transport of the deposit portion 11 at the timing when the number of banknotes S held in the temporary holding portion 18 in the outbound path processing of the batch processing is expected to reach the holdable number Nt, and switches the processing to the return path processing. In this case, the banknotes S may remain in the deposit portion 11 without being fully held in the temporary holding portion 18 in the outbound path processing.

Accordingly, when there are banknotes S remaining in the deposit portion 11 before the banknotes S that do not reach the batch number are finally fed from the temporary holding portion 18 to the dispensing portion 12 in the return path processing, the control portion 81 performs the outbound path processing, holds the banknotes S remaining in the deposit portion 11 in the temporary holding portion 18, and then performs the return path processing. This processing is appropriately repeated until there are no more banknotes S remaining in the deposit portion 11.

That is, when it is determined that the number of banknotes S held in the temporary holding portion 18 is less than the predetermined batch number, the control portion 81 holds the banknotes S inserted into the deposit portion 11 in the temporary holding portion 18 so that the number of banknotes S held in the temporary holding portion 18 is at least greater than or equal to the batch number.

For example, in the outbound path processing described above, when the holdable number Nt that can be held in the temporary holding portion 18 is reached with 375 banknotes of the ruble currency and 410 banknotes of the US dollar currency, the control portion 81 performs the return path processing in the same manner as described above when a sensor (not shown) detects that there are banknotes S in the deposit portion 11, but the final processing is different.

That is, the control portion 81 determines whether the total number of banknotes S of the US dollar currency fed from the temporary holding portion 18 in the return path processing by that point in the batch processing of this time is less than the number of banknotes S of the US dollar currency held in the temporary holding portion 18 in the outbound path processing of the batch processing of this time, and the difference between the total number and the number is less than the batch number Nk (for example, 10). When the control portion 81 determines that this is so, the control portion 81 performs the outbound path processing, holds the banknotes S remaining in the deposit portion 11 in the temporary holding portion 18 so that the total number of banknotes S remaining in the deposit portion 11 and the number (for example, 10) of remaining banknotes S held in the batch processing of this time is within the range of the holdable number Nt, and then performs the return path processing again. This processing is appropriately repeated until there are no more banknotes S remaining in the deposit portion 11.

Figure 9:
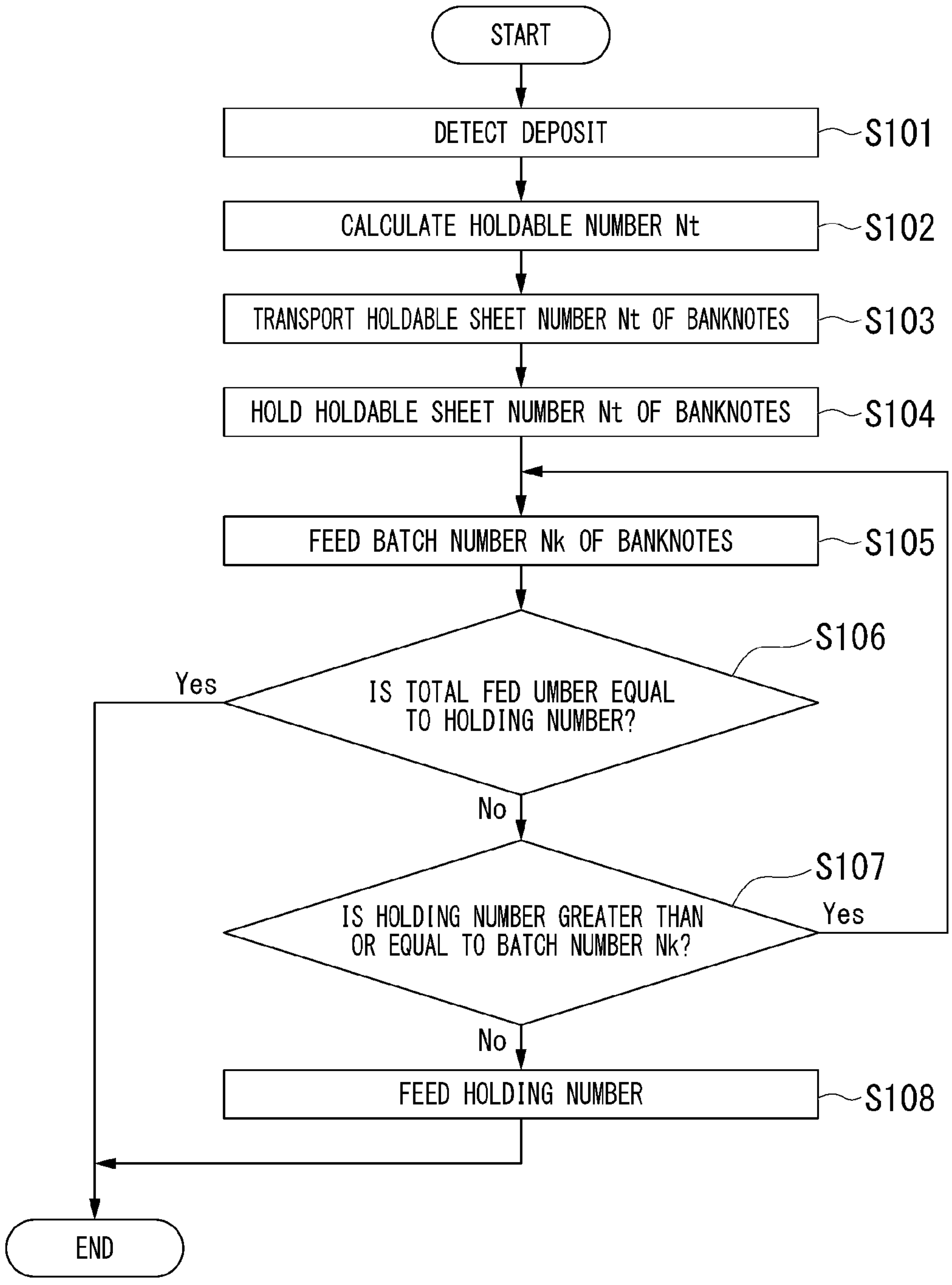
FIG. 9 is a flowchart showing basic control of batch processing in the paper sheet processing device according to the embodiment.

The basic control of the above batch processing is based on the flowchart shown in FIG. 9. That is, when the control portion 81 of the arithmetic device 15 detects the deposit of the banknotes S into the deposit portion 11 by a sensor (not shown) (step S101), the calculation portion 82 of the arithmetic device 15 calculates the holdable number Nt of banknotes S that can be held in the temporary holding portion 18 at that time (step S102). Then, the control portion 81 drives and controls the deposit portion 11 and the transport mechanism 20, transports as many banknotes S as possible within the range of the holdable number Nt from the deposit portion 11 toward the temporary holding portion 18 (step S103), and holds the banknotes S in the temporary holding portion 18 (step S104). That is, the number of banknotes S, which is calculated by the calculation portion 82, that can be held in the temporary holding portion 18 are transported to the temporary holding portion 18 to be held. At that time, the temporary holding portion 18 winds and holds the banknotes S one by one together with the tape 30 by the drum 31.

Next, the control portion 81 drives the temporary holding portion 18, feeds the predetermined batch number Nk of banknotes S among the banknotes S held in the temporary holding portion 18 from the temporary holding portion 18, transports the banknotes S by the transport mechanism 20, and feeds the banknotes S to the dispensing portion 12 (step S105). That is, the banknotes S held in the temporary holding portion 18 are dispensed one by one to the dispensing portion 12 until the batch number is reached. Next, it is determined whether the total fed number, which is the total number of banknotes S fed from the temporary holding portion 18 to the dispensing portion 12, reaches the holding number held in the temporary holding portion 18 in the batch processing of this time (step S106). When the total fed number reaches the holding number held in the temporary holding portion 18 in the batch processing of this time (step S106: YES), the control portion 81 determines that all the banknotes S held in the temporary holding portion 18 are organized and counted to end the batch processing.

On the other hand, when the total fed number does not reach the holding number held in the temporary holding portion 18 in the batch processing of this time (step S106: NO), in other words, when the total fed number of banknotes S is less than the holding number, the control portion 81 determines whether the holding number, which is the number remaining in the temporary holding portion 18 at that time, among the banknotes S held in the temporary holding portion 18 in the batch processing of this time, is greater than or equal to the batch number Nk (step S107). When the holding number is greater than or equal to the batch number Nk (step S107: YES), the batch number Nk of banknotes S held in the temporary holding portion 18 can be counted and fed, and thus the processing returns to the step S105, and the batch number Nk of banknotes S are fed again from the temporary holding portion 18 and transported to the dispensing portion 12 by the transport mechanism 20.

On the other hand, when the holding number of banknotes S held in the temporary holding portion 18 is not greater than or equal to the batch number Nk (step S107: NO), the batch number Nk of banknotes S held in the temporary holding portion 18 cannot be counted and fed. Accordingly, the control portion 81 drives the temporary holding portion 18, and feeds the holding number, which is the number remaining in the temporary holding portion 18 at that time, among the banknotes S held in the temporary holding portion 18 in the batch processing of this time, from the temporary holding portion 18. The fed banknotes are transported by the transport mechanism 20 and fed to the dispensing portion 12 (step S108).

As described above, in the embodiment, (1) A configuration is provided in which the paper sheet processing device 10 which counts predetermined batch numbers of a plurality of paper sheets (banknotes S) inserted into the deposit portion 11 and dispenses the paper sheets to the dispensing portion 12 includes the temporary holding portion 18 configured to hold the banknotes S inserted into the deposit portion 11 and feed the held banknotes S, and the control portion 81 configured to perform feed control of the banknotes S in the temporary holding portion 18 and transport control of the banknotes S inserted into the deposit portion 11, in which the control portion 81 performs control to feed the batch number of banknotes S held in the temporary holding portion 18 to divide and dispense the banknotes S to the dispensing portion 12.

In this way, the paper sheet processing device 10 transports a number of the plurality of banknotes S inserted into the deposit portion 11 that can be held in the temporary holding portion 18 (more than the batch number) on the outbound path regardless of the batch number all at once to the temporary holding portion 18 to hold the banknotes S. The paper sheet processing device 10 divides the banknotes S held in the temporary holding portion 18 into groups of the batch number, transports the banknotes S on the return path, and dispenses the banknotes S to the dispensing portion 12. In this respect, in the related art, the batch number of the plurality of banknotes S inserted into the deposit portion 11 are transported on the outbound path and held in the temporary holding portion 18, and the processing of transporting all of the batch number of held banknotes S on the return path to the dispensing portion 12 is repeated until there are no more banknotes S inserted into the deposit portion 11. That is, in the related art, the processing is repeated in which the batch number of banknotes are transported on the outbound path from the deposit portion 11 to the temporary holding portion 18 to be held, by switching to the return path transport, the banknotes held in the temporary holding portion 18 are dispensed to the dispensing portion 12, and by switching to the outbound path transport again, the batch number of banknotes are transported on the outbound path from the deposit portion 11 to the temporary holding portion 18 to be held. According to the configuration of the present example, as compared with the configuration in the related art, by the amount of the banknotes S inserted into the deposit portion 11 that are collected all at once being transported on the outbound path to the temporary holding portion 18 to be held, it is possible to reduce the number of times the outbound path transport processing of the banknotes S from the deposit portion 11 to the temporary holding portion 18 is performed. That is, it is possible to reduce the number of times switching from the return path transport processing to the outbound path transport processing is performed, which is performed for each batch number in the related art. Accordingly, it is possible to shorten the batch processing time for taking out and bundling the banknotes S in groups of the batch number. That is, the efficiency of batch processing can be improved.

(2) The configuration is provided in which the temporary holding portion 18 has a rotating body (the drum 31) configured to wind the banknotes S one by one, and the drum 31 feeds the wound banknotes S one by one.

With this configuration, the drum 31 included in the temporary holding portion 18 can accurately wind and feed the banknotes S one by one. Accordingly, in the paper sheet processing device 10, the plurality of banknotes S held in the temporary holding portion 18 having such drum 31 are fed one by one until the batch number is reached, so that it is possible to reduce the number of times that the banknotes S are transported from the deposit portion 11 to the temporary holding portion 18, and to shorten the counting time for each predetermined number of banknotes S.

(3) The configuration is provided to include the calculation portion 82 configured to calculate the number of banknotes S that are holdable in the temporary holding portion 18, in which the control portion 81 holds in the temporary holding portion 18 the number of banknotes S calculated by the calculation portion 82 that are holdable in the temporary holding portion 18.

With this configuration, the control portion 81 transports the number of banknotes S calculated by the calculation portion 82 that can be held in the temporary holding portion 18 among the banknotes S inserted into the deposit portion 11 all at once to the temporary holding portion 18 to hold the banknotes S, and thus the banknotes S can be efficiently held in the temporary holding portion 18. As a result, the number of times the outbound path transport processing of the banknote S from the deposit portion 11 to the temporary holding portion 18 is performed can be reduced.

(4) The configuration is provided in which the calculation portion 82 calculates the holdable number of paper sheets that are holdable in the temporary holding portion 18 at the present time based on the maximum holdable number of paper sheets that are holdable in the empty temporary holding portion 18 and the number of banknotes S currently held in the temporary holding portion 18.

With this configuration, the paper sheet processing device 10 can transport the holdable number of banknotes S calculated by the calculation portion 82 that can be held in the temporary holding portion 18 at the present time all at once to the temporary holding portion 18 to hold the banknotes S, and then can feed the held banknotes S one by one from the temporary holding portion 18 until the batch number is reached. Accordingly, the paper sheet processing device 10 may repeat the processing of feeding the banknotes S one by one from the temporary holding portion 18 that holds the holdable number banknotes S can be held in the temporary holding portion 18 at the present time until the batch number is reached, until there are no more banknotes S inserted into the deposit portion 11. Accordingly, the number of times that the outbound path transport processing for each batch number of the banknotes S from the deposit portion 11 to the temporary holding portion 18 is performed can be reduced, and the time required for the counting processing of the banknotes S can be shortened as much as possible according to the holding capacity of the temporary holding portion 18.

(5) The configuration is provided to include a mode switching portion 84 which switches between a counting mode in which a predetermined batch number of the banknotes S are counted among the plurality of paper sheets set into the deposit portion and transported to the dispensing portion 12, and a storage mode in which the plurality of banknotes S inserted into the deposit portion 11 are classified into predetermined types and stored.

With this configuration, the paper sheet processing device 10 is switched to the counting mode by the mode switching portion 84, so that the banknotes S inserted into the deposit portion 11 are held in the temporary holding portion 18, and then fed from the temporary holding portion 18 to the dispensing portion 12. Accordingly, in the paper sheet processing device 10, the maximum number of banknotes S inserted into the deposit portion 11 that can be wound in the temporary holding portion 18 can be wound up in the temporary holding portion 18 all at once, and from there, can be divided and transported to the dispensing portion 12 on the return path one by one until the batch number is reached. As a result, in the paper sheet processing device 10, the number of times that the banknotes S are transported from the deposit portion 11 to the temporary holding portion 18 can be reduced in the counting mode in which the banknotes S inserted into the deposit portion 11 are taken out in groups of the batch number, and the time of the counting processing of the banknotes S can be shortened.

(6) The configuration is provided in which, when determination is made that the number of banknotes S held in the temporary holding portion 18 is less than the predetermined batch number, the control portion 81 holds the banknotes S inserted into the deposit portion 11 in the temporary holding portion 18 so that the number of banknotes S held in the temporary holding portion 18 is at least greater than or equal to the batch number.

With this configuration, when determination is made that the number of banknotes S held in the temporary holding portion 18 is less than the batch number, the control portion 81 transports the banknotes S from the deposit portion 11 so that the number of banknotes S held in the temporary holding portion 18 is greater than or equal to the batch number. Accordingly, the paper sheet processing device 10 can efficiently count the banknotes S inserted into the deposit portion 11.

(7) The configuration is provided to further include a display portion (the operation display portion 14) that displays information on the operation status of the paper sheet processing device 10, and the operation display portion 14 displays the operation status of the paper sheet processing device 10 in different display modes between the first state in which the number of banknotes S held in the temporary holding portion 18 is greater than or equal to the predetermined batch number, and the second state in which the number of banknotes S held in the temporary holding portion 18 is less than the predetermined batch number.

With this configuration, in the paper sheet processing device 10, when the number of banknotes S held in the temporary holding portion 18 is less than the batch number, the operation display portion 14 clearly displays the same, and thus the situation where the counting of the batch number cannot be performed can be easily understood visually.

(8) A configuration is provided in which a paper sheet processing method of counting a plurality of banknotes S inserted into the deposit portion 11 for into groups of a predetermined batch number and dispensing the paper sheets to the dispensing portion 12 includes calculating a number of banknotes that are holdable in the temporary holding portion 18 among the plurality of banknotes S inserted into the deposit portion 11, transporting the calculated number of banknotes S that are holdable in the temporary holding portion 18 to the temporary holding portion 18 to hold the banknotes S, and dispensing the banknotes S held in the temporary holding portion 18 one by one to the dispensing portion 12 until the paper sheets reach the batch number.

With this configuration, the paper sheet processing device 10 holds the plurality of banknotes S inserted into the deposit portion 11 in the temporary holding portion 18, and the banknotes S held in the temporary holding portion 18 are fed in groups of the batch number and divided and dispensed to the dispensing portion 12. Then, compared to a case where the processing of holding the plurality of banknotes S inserted into the deposit portion 11 in the temporary holding portion 18 in groups of the batch number and then transporting all of the batch number of held banknotes S to the dispensing portion 12 is repeated until there are no more banknotes S inserted into the deposit portion 11, all of the banknotes S inserted into the deposit portion 11 are collected at once and held in the temporary holding portion 18, and thus the number of times that the banknotes S are transported from the deposit portion 11 to the temporary holding portion 18 can be reduced and the time required to take the banknote S out in groups of the batch number can be shortened. Accordingly, the efficiency of the batch processing can be improved.

(9) The configuration is provided in which the temporary holding portion 18 winds the banknotes S one by one by a rotating body (drum 31) and holds the banknotes S.

With this configuration, the control portion 81 holds the paper sheets of the number calculated by the calculation portion 82 that can be held in the temporary holding portion 18 among the banknotes S inserted into the deposit portion 11 all at once in the temporary holding portion 18, and thus the banknotes S can be efficiently held in the temporary holding portion 18, and the number of times that the banknotes S are transported from the deposit portion 11 to the temporary holding portion 18 can be reduced.

(10) The configuration is provided to further include calculating the holdable number of banknotes S that are holdable in the temporary holding portion at the present time based on the maximum holdable number of banknotes S that are holdable in the empty temporary holding portion and the number of banknotes S currently held in the temporary holding portion.

With this configuration, the paper sheet processing device 10 can hold the holdable number of banknotes S calculated by the calculation portion 82 that can be held in the temporary holding portion 18 at the present time all at once in the temporary holding portion 18, and then can feed the held banknotes S one by one from the temporary holding portion 18 until the batch number is reached. Accordingly, the paper sheet processing device 10 may repeat the processing of feeding the banknotes S one by one from the temporary holding portion 18 that holds the holdable number of banknotes S that can be held in the temporary holding portion 18 at the present time until the batch number is reached, until there are no more banknotes S inserted into the deposit portion 11, and thus the number of times that the banknotes S are transported from the deposit portion 11 to the temporary holding portion 18 can be reduced, and the time required for the counting processing of the banknotes S can be shortened as much as possible according to the holding capacity of the temporary holding portion 18.

In the above embodiment, the paper sheet processing device 10 that processes banknotes as paper sheets is described as an example, but it can be applied to any device that processes various paper sheets other than banknotes in the same manner, such as securities or cash vouchers.

REFERENCE SIGNS LIST

10: Paper sheet processing device
11: Deposit portion
12: Dispensing portion
14: Operation display portion (display portion)
18: Temporary holding portion
31: Drum (rotating body)
81: Control portion
82: Calculation portion
84: Mode switching portion
S: Banknote (paper sheet)

The invention claimed is:

1. A paper sheet processing device which counts a predetermined batch number of a plurality of paper sheets set in a deposit container and dispenses the paper sheets to a dispensing container, the paper sheet processing device comprising:

a temporary holder configured to temporarily hold the paper sheets set in the deposit container and feed the held paper sheets to the dispensing container;

a display which displays information on an operation status of the paper sheet processing device; and a controller portion configured to perform feed control of the paper sheets temporarily held in the temporary holder to the dispensing container and transport control of the paper sheets set in the deposit container to the temporary holder, wherein:

the display displays the operation status of the paper sheet processing device in different display modes between a first state in which the number of paper sheets held in the temporary holder is greater than or equal to the predetermined batch number, and a second state in which the number of paper sheets held in the temporary holder is less than the predetermined batch number, and in a batch processing in which the controller feeds the paper sheets held in the temporary holder divided into groups of the predetermined batch number and transport the paper sheets to the dispensing container, when the number of the paper sheets held in the temporary holder is in the second state, the controller displays characters representing the predetermined batch number in the display in a second display mode different from a first display mode before feeding the paper sheets held in the temporary holder whose number is less than the predetermined batch number to the dispensing container, the first display mode being used when the number of paper sheets held in the temporary holder is in the first state.

2. The paper sheet processing device according to claim 1, wherein the temporary holder has a rotating body configured to wind the paper sheets one by one, and the rotating body feeds the wound paper sheets one by one.

3. The paper sheet processing device according to claim 1, further comprising:

a calculator configured to calculate a number of the paper sheets that are holdable in the temporary holder, wherein the controller holds in the temporary holder the number of paper sheets calculated by the calculator that are holdable in the temporary holder.

4. The paper sheet processing device according to claim 3, wherein the calculator calculates a holdable number of paper sheets that are holdable in the temporary holder based on a maximum holdable number of the paper sheets that are holdable in the empty temporary holder and the number of paper sheets held in the temporary holder.

5. The paper sheet processing device according to claim 1, further comprising a mode switch which switches between a counting mode in which the paper sheets are counted into the predetermined batch number among the plurality of paper sheets set into the deposit container and transported to the dispensing container, and a storage mode in which the plurality of paper sheets set in the deposit container are classified into predetermined types and stored.

6. The paper sheet processing device according to claim 1, wherein, when determination is made that the number of paper sheets held in the temporary holder is less than the predetermined batch number, the controller sends the paper sheets set in the deposit container to the temporary holder so that the number of paper sheets held in the temporary holder is at least more than the batch number.

7. The paper sheet processing device according to claim 1, wherein the characters representing the predetermined batch number is displayed in a first color in the first display mode while the characters representing the predetermined batch number is displayed in a second color in the second display mode, the second color being different from the first color.

8. A paper sheet processing method of counting a plurality of paper sheets set in a deposit container into groups of a predetermined batch number and dispensing the paper sheets to a dispensing container, the paper sheet processing method comprising:

calculating a number of the paper sheets that are holdable in a temporary holder temporarily holding the plurality of paper sheets set in the deposit container;

transporting the calculated number of paper sheets that are holdable from the deposit container to the temporary holder to hold the paper sheets; and in a batch processing for transporting the paper sheets held in the temporary holder one by one to the dispensing container until the paper sheets reach the predetermined batch number, when the number of the paper sheets held in the temporary holder in a first state in which the number of paper sheets held in the temporary holder is greater than or equal to the predetermined batch number, becomes that in a second state in which the number of paper sheets held in the temporary holder is less than the predetermined batch number, displaying characters representing the predetermined batch number in a second display mode different from a first display mode before feeding the paper sheets held in the temporary holder whose number is less than the predetermined batch number to the dispensing container, the first display mode being used when the number of paper sheets held in the temporary holder is in the first state.

9. The paper sheet processing method according to claim 8, wherein the temporary holder winds paper sheets one by one by a rotating body and holds the paper sheets.

10. The paper sheet processing method according to claim 8, further comprising calculating a holdable number of paper sheets that are holdable in the temporary holder based on a maximum holdable number of the paper sheets that are holdable in the empty temporary holder and the number of paper sheets held in the temporary holder.

11. The paper sheet processing method according to claim 8, wherein the characters representing the predetermined batch number is displayed in a first color in the first display mode while the characters representing the predetermined batch number is displayed in a second color in the second display mode, the second color being different from the first color.

* * * * *